US011239969B2

(12) United States Patent
Qin et al.

(10) Patent No.: US 11,239,969 B2
(45) Date of Patent: Feb. 1, 2022

(54) REFERENCE SIGNAL TRANSMISSION TECHNOLOGY

(71) Applicant: HUAWEI TECHNOLOGIES CO., LTD., Guangdong (CN)

(72) Inventors: Yi Qin, Kista (SE); Shengyue Dou, Shanghai (CN); Zhongfeng Li, Munich (DE); Hua Li, Shanghai (CN); Min Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 16/576,114

(22) Filed: Sep. 19, 2019

(65) Prior Publication Data

US 2020/0014515 A1     Jan. 9, 2020

Related U.S. Application Data

(63) Continuation of application No. PCT/CN2018/080398, filed on Mar. 24, 2018.

(30) Foreign Application Priority Data

Mar. 24, 2017  (CN) .......................... 201710184923.0
Jun. 16, 2017  (CN) .......................... 201710459768.9

(51) Int. Cl.
*H04L 5/00* (2006.01)
*H04B 1/713* (2011.01)
(Continued)

(52) U.S. Cl.
CPC ........... *H04L 5/0051* (2013.01); *H04B 1/713* (2013.01); *H04L 5/0094* (2013.01); *H04L 25/0226* (2013.01); *H04L 27/2613* (2013.01)

(58) Field of Classification Search
None
See application file for complete search history.

(56) References Cited

U.S. PATENT DOCUMENTS

2011/0007778 A1   1/2011   Kishiyama et al.
2013/0070725 A1   3/2013   Wang et al.
(Continued)

FOREIGN PATENT DOCUMENTS

CN   101779392 A   7/2010
CN   101841918 A   9/2010
(Continued)

OTHER PUBLICATIONS

LG Electronics, "Frequency hopping operation for UL sounding RS", Oct. 2007, 3GPP Draft, R1-074191, pp. 1-5.*
(Continued)

*Primary Examiner* — Adnan Baig
(74) *Attorney, Agent, or Firm* — Fish & Richardson P.C.

(57) ABSTRACT

Example reference signal transmission methods and apparatus are described. In one example method, a base station divides a transmission bandwidth into a plurality of frequency domain units, and sends reference signal sending configuration information to a terminal. The terminal transmits a reference signal on one or more frequency domain units. The one or more frequency domain units and another frequency domain unit form a part of the transmission bandwidth supported by the base station. The terminal sends the reference signal on the one or more frequency domain units to the base station based on the reference signal sending configuration information.

16 Claims, 7 Drawing Sheets

(51) Int. Cl.
*H04L 25/02* (2006.01)
*H04L 27/26* (2006.01)

(56) References Cited

U.S. PATENT DOCUMENTS

| | | |
|---|---|---|
| 2015/0373721 A1 | 12/2015 | Zhang et al. |
| 2019/0044775 A1* | 2/2019 | Zhang ................. H04L 27/2613 |
| 2019/0109686 A1* | 4/2019 | Jiang .................... H04L 5/0007 |

FOREIGN PATENT DOCUMENTS

| | | |
|---|---|---|
| CN | 102281642 A | 12/2011 |
| JP | 4394746 B1 | 1/2010 |
| JP | 2011171972 A | 9/2011 |

OTHER PUBLICATIONS

LG Electronics, "Freqeuncy hopping operation for UL sounding RS" Oct. 2007, 3GPP Draft, R1-074191, pp. 1-5.*

LG Electronics, "Frequency hopping operation for UL sounding RS," 3GPP TSG RAN WG1 #50bis, R1-074191; Shanghai, China, XP050107720, Oct. 8-12, 2007, 6 pages.

Qualcomm Incorporated, "Discussion on SRS Design," 3GPP TSG RAN WG1 Meeting #88, R1-1702618; Athens, Greece, XP051209771, Feb. 13-17, 2017, 12 pages.

Extended European Search Report issued in European Application No. 18771023.1 dated Dec. 16, 2019, 11 pages.

PCT International Search Report and Written Opinion issued in International Application No. PCT/CN2018/080398 dated May 30, 2018, 15 pages (with English translation).

Office Action issued in Indian Application No. 201937030137 dated Oct. 22, 2020, 6 pages.

\* cited by examiner

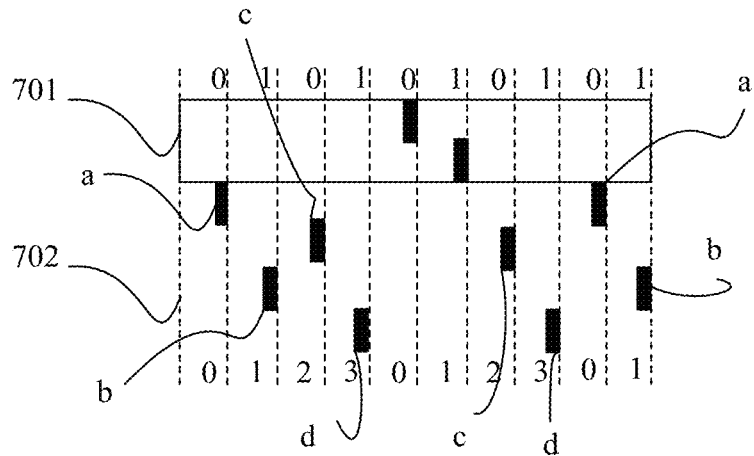

FIG. 7

801. A base station sends an indication of a plurality of reference signal resources and a first indication, where the indication includes information about the plurality of reference signal resources and information indicating that the plurality of reference signal resources belong to a first group, and the first indication information indicates a QCL relationship between antenna ports of a reference signal transmitted on the plurality of reference signal resources in the first group 802. A terminal sends the reference signal based on the first indication information and the indication of the plurality of reference signal resources

REFERENCE SIGNAL TRANSMISSION TECHNOLOGY

CROSS-REFERENCE TO RELATED APPLICATIONS

This application is a continuation of International Application No. PCT/CN2018/080398, filed on Mar. 24, 2018, which claims priority to Chinese Patent Application No. 201710459768.9, filed on Jun. 16, 2017 and Chinese Patent Application No. 201710184923.0, filed on Mar. 24, 2017. The disclosures of the aforementioned applications are hereby incorporated by reference in their entireties.

TECHNICAL FIELD

Embodiments of the present invention relate to communications technologies, and in particular, to a reference signal transmission technology.

BACKGROUND

In an LTE/LTE-A system, uplink measurement of a terminal 110 is implemented by sending a sounding reference signal (SRS). Referring to FIG. 1, a base station 110 obtains uplink channel state information by measuring the SRS received from the terminal 120. If the terminal 120 and the base station 110 have uplink and downlink channel reciprocity, the base station 110 may further obtain downlink channel information. In the LTE/LTE-A system, the terminal 120 distant from the base station 110 may be limited by power of the terminal 110 when the terminal 120 has different distances to the base station 110. If the SRS is sent on an entire transmission bandwidth, received signal strength may be low and test accuracy may be poor due to insufficient power. To ensure sufficient power for receiving the SRS by the base station 110, the SRS sent by the terminal 120 may be sent on only a part of the transmission bandwidth. To measure the transmission bandwidth, the SRS needs to be transmitted on different parts of the bandwidth in a frequency hopping manner, to complete measurement on a system bandwidth. Frequency hopping in the LTE/LTE-A system is performed based on a cell-level configured bandwidth. In other words, a frequency hopping method of the terminal 110 is determined based on a total SRS measurement bandwidth uniformly configured for a cell, thereby ensuring frequency hopping orthogonality. Although the terminal 120 is also supported in measuring a part of the total bandwidth of the base station 110, the frequency hopping method of the terminal 120 is determined based on the total bandwidth, and a delay is related to a delay after frequency hopping is completed on the total bandwidth.

In a new generation mobile communications system (NR, new radio), or in another communications system, terminals 120 served by the base station 110 may need to measure different bandwidths. Therefore, an original manner of performing frequency hopping based on the total SRS measurement bandwidth uniformly configured for the cells may be not applicable.

SUMMARY

Embodiments of the present invention provide a reference signal sending technology applicable to a plurality of transmission bandwidths, to improve wireless transmission performance.

According to a first aspect, an embodiment of the present invention provides a reference signal sending method. A terminal receives reference signal sending configuration information from a base station. The reference signal sending configuration information instructs the terminal to transmit a reference signal on one or more frequency domain units. The one or more frequency domain units and another frequency domain unit form a part of a transmission bandwidth supported by the base station. The terminal sends the reference signal on the one or more frequency domain units to the base station based on the reference signal sending configuration information.

According to a second aspect, an embodiment of the present invention provides a reference signal sending apparatus. The apparatus includes a processing unit and a transceiver unit. The transceiver unit receives a reference signal sending configuration message from a base station. The reference signal sending configuration information instructs a terminal to transmit a reference signal on one or more frequency domain units. The one or more frequency domain units and another frequency domain unit form a part of a transmission bandwidth supported by the base station. The processing unit instructs, based on the reference signal sending configuration information, the transceiver unit to send the reference signal on the one or more frequency domain units to the base station.

According to a third aspect, an embodiment of the present invention provides a reference signal configuration information sending method. A base station generates reference signal sending configuration information. The reference signal sending configuration information instructs a terminal to transmit a reference signal on one or more frequency domain units. The one or more frequency domain units and another frequency domain unit form a part of a transmission bandwidth supported by the base station. The base station sends the reference signal sending configuration information to the terminal.

According to a fourth aspect, an embodiment of the present invention provides a reference signal configuration information sending apparatus. The sending apparatus includes a processing unit and a transceiver unit. The processing unit generates reference signal sending configuration information. The reference signal sending configuration information instructs a terminal to transmit a reference signal on one or more frequency domain units. The one or more frequency domain units and another frequency domain unit form a part of a transmission bandwidth supported by a base station. The transceiver unit sends the reference signal sending configuration information to the terminal.

In a possible implementation, the reference signal sending configuration information includes an indication of a time-frequency resource that is used to transmit the reference signal, and the reference signal sending configuration information includes a first parameter that is used to indicate an order in which the terminal transmits the reference signal on the plurality of frequency domain units.

In a possible implementation, an order in which the terminal sends the reference signal on the plurality of frequency domain units is preset.

In a possible implementation, an order in which the processing unit in the second aspect instructs the transceiver unit to send the reference signal on the plurality of frequency domain units is preset.

In a possible implementation, the reference signal sending configuration information includes a second parameter that is used to indicate a correspondence between a time unit at which the terminal sends the reference signal and a frequency domain unit on which the terminal sends the reference signal.

In a possible implementation, the reference signal sending configuration information includes a grouping parameter that is used to instruct the terminal to group the plurality of frequency domain units, and reference signals can be simultaneously sent on different groups of frequency domain units.

In a possible implementation, the grouping parameter includes a quantity of frequency domain unit groups, and the terminal or the processing unit in the second aspect determines, based on the quantity of frequency domain unit groups and a quantity of frequency domain units supported by the terminal or the processing unit, frequency domain units included in the frequency domain unit group.

In a possible implementation, the reference signal configuration information includes one or more types of the following information: a reference signal transmission period in a frequency domain unit, a reference signal bandwidth in the frequency domain unit, a maximum reference signal bandwidth in the frequency domain unit, a start subcarrier position in which the reference signal is sent in the frequency domain unit, and a correspondence between a time domain resource and a frequency domain position of the reference signal in the frequency domain unit.

In a possible implementation, the reference signal configuration information includes a reference period indication parameter of the reference signal, and the terminal or the processing unit in the second aspect determines the reference signal transmission period in a frequency domain unit based on the quantity of frequency domain units supported by the terminal or the processing unit, a bandwidth of the frequency domain unit or a bandwidth that is used to transmit the reference signal in the frequency domain unit, and a frequency hopping bandwidth of each hop.

In a possible implementation, the reference signal sending configuration information includes a reference bandwidth indication of the reference signal, and the terminal or the processing unit in the second aspect obtains the reference signal bandwidth in the frequency domain unit based on the reference bandwidth indication of the reference signal, a subcarrier spacing of the frequency domain unit, and reference signal frequency domain density in the frequency domain unit.

In a possible implementation, the reference signal bandwidth is not greater than the bandwidth of the frequency domain unit or the maximum reference signal bandwidth in the frequency domain unit.

In a possible implementation, the reference signal sending configuration information includes a reference start subcarrier indication of the reference signal, and the reference start subcarrier indication of the reference signal is used to indicate a start subcarrier for sending the reference signal.

In a possible implementation, identifiers of start subcarriers of the reference signal in the plurality of frequency domain units are the same.

In a possible implementation, the reference signal sending configuration information includes an indication of a reference correspondence between a time domain resource and a frequency domain position of the reference signal; and the terminal or the processing unit in the second aspect determines the correspondence between the time domain resource and the frequency domain position of the reference signal in the frequency domain unit based on the reference correspondence between the time domain resource and the frequency domain position of the reference signal, or the terminal or the processing unit in the second aspect determines the correspondence between the time domain resource and the frequency domain position of the reference signal in the frequency domain unit based on the reference signal bandwidth in the frequency domain unit and the reference correspondence between the time domain resource and the frequency domain position of the reference signal.

In a possible implementation, the frequency domain position of the reference signal in the frequency domain unit is determined based on a time of sending the reference signal on the plurality of frequency domain units supported by the terminal.

In a possible implementation, the reference signal sending configuration message includes: a first bandwidth that is used to indicate a bandwidth used to transmit the reference signal in the frequency domain unit, and a second bandwidth that is used to indicate a bandwidth for sending the reference signal on a symbol, and the first bandwidth consists of a plurality of second bandwidths. The terminal determines, based on a preset rule or configuration information from the base station, to select some second bandwidths in a reference signal period to send the reference signal.

In a possible implementation, the plurality of second bandwidths used to send the reference signal are located on different symbols.

In a possible implementation, the preset rule is that, when the currently transmitted reference signal is used for beam sweeping, or a subcarrier spacing of the currently transmitted reference signal is greater than a reference subcarrier spacing or a subcarrier spacing that is of PUSCH transmission performed by the terminal on the frequency domain unit and that is configured by the base station, the terminal determines to send the reference signal in the reference signal period on some of the plurality of second bandwidths forming the first bandwidth.

In a possible implementation, the configuration information from the base station is at least one of the following types of configuration information: (1) indication information including identifiers of some second bandwidths, used to instruct the terminal to send the reference signal on the second bandwidths; (2) indication information including index information for obtaining identifiers of some second bandwidths, used to instruct the terminal to send the reference signal on the second bandwidths; (3) indication information including a frequency domain spacing, used to instruct the terminal to transmit the reference signal on the plurality of second bandwidths whose spacing is the frequency domain spacing, where the second bandwidths meeting the frequency domain spacing includes a preset start frequency domain position or a start frequency domain position indicated by the base station; and (4) indication information including a sequence spacing of the second bandwidths, used to instruct the terminal to determine, based on the sequence spacing, some second bandwidths for sending the reference signal.

According to a fifth aspect, an embodiment of the present invention provides a communications apparatus, including a processor and a transceiver. The processor performs functions of the processing unit in the second aspect, and the transceiver performs functions of the transceiver unit in the second aspect.

According to a sixth aspect, an embodiment of the present invention provides a communications apparatus, including a processor and a transceiver. The processor performs functions of the processing unit in the fourth aspect, and the transceiver performs functions of the transceiver unit in the fourth aspect.

According to a seventh aspect, an embodiment of the present invention provides a program. When executed by a processor, the program is used for performing the method in the first aspect or any optional manner of the first aspect.

According to an eighth aspect, an embodiment of the present invention provides a program. When executed by a processor, the program is used for performing the method in the third aspect or any optional manner of the third aspect.

According to a ninth aspect, an embodiment of the present invention provides a program product, for example, a computer-readable storage medium, and the program product includes the program in the seventh aspect or the program in the eighth aspect.

In the foregoing aspects, a reference signal sending configuration message is separately sent for frequency domain units, so that terminals served by a same base station can still feed back reference signals in a frequency hopping manner when different bandwidths are supported.

According to a tenth aspect, an embodiment of the present invention provides a reference signal sending method. A terminal receives an indication of a plurality of reference signal resources. The indication includes information about the plurality of reference signal resources, and information indicating that the plurality of reference signal resources belong to a first group. The terminal receives first indication information. The first indication information indicates a relationship between reference signals transmitted on the plurality of reference signal resources in the first group. The terminal sends a reference signal based on the first indication information and the indication of the plurality of reference signal resources.

According to an eleventh aspect, an embodiment of the present invention provides a reference signal sending apparatus. The sending apparatus includes a processor and a transceiver. The transceiver receives an indication of a plurality of reference signal resources. The indication includes information about the plurality of reference signal resources, and information indicating that the plurality of reference signal resources belong to a first group. The transceiver receives first indication information. The first indication information indicates a relationship between reference signals transmitted on the plurality of reference signal resources in the first group. The processor instructs, based on the first indication information and the indication of the plurality of reference signal resources, the transceiver to send a reference signal.

According to a twelfth aspect, an embodiment of the present invention provides a reference signal configuration message sending method. A base station generates an indication of a plurality of reference signal resources. The indication includes information about the plurality of reference signal resources, and information indicating that the plurality of reference signal resources belong to a first group. The base station generates first indication information. The first indication information indicates a relationship between reference signals transmitted on the plurality of reference signal resources in the first group. The base station sends the first indication information and the indication of the plurality of reference signal resources to the terminal.

According to a thirteenth aspect, an embodiment of the present invention provides a reference signal configuration message sending apparatus. The apparatus includes a processor and a transceiver. The processor generates an indication of a plurality of reference signal resources. The indication includes information about the plurality of reference signal resources, and information indicating that the plurality of reference signal resources belong to a first group.

The processor generates first indication information. The first indication information indicates a relationship between reference signals transmitted on the plurality of reference signal resources in the first group. The processor instructs the transceiver to send the first indication information and the indication of the plurality of reference signal resources to a terminal.

In a possible implementation, the relationship between reference signals transmitted on the plurality of reference signal resources includes a quasi co-location (QCL) relationship between antenna ports of the reference signals transmitted on the plurality of reference signal resources. The QCL relationship means that a parameter of an antenna port may be determined based on a parameter of another antenna port.

In a possible implementation, the QCL relationship is at least one of the following: A same transmit beam is used for the reference signals; different transmit beams are used for the reference signals; a same receive beam is used for the reference signals; and different receive beams are used for the reference signals.

In a possible implementation, the first indication information includes a time domain difference between time-frequency resources of the plurality of reference signal resources.

According to a fourteenth aspect, an embodiment of the present invention provides a communications apparatus, including a processor and a transceiver. The processor performs functions of the processing unit in the eleventh aspect, and the transceiver performs functions of the transceiver unit in the eleventh aspect.

According to a fifteenth aspect, an embodiment of the present invention provides a communications apparatus, including a processor and a transceiver. The processor performs functions of the processing unit in the thirteenth aspect, and the transceiver performs functions of the transceiver unit in the thirteenth aspect.

According to a sixteenth aspect, an embodiment of the present invention provides a program. When executed by a processor, the program is used for performing the method in the tenth aspect or any optional manner of the tenth aspect.

According to a seventeenth aspect, an embodiment of the present invention provides a program. When executed by a processor, the program is used for performing the method in the twelfth aspect or any optional manner of the twelfth aspect.

According to an eighteenth aspect, an embodiment of the present invention provides a program product, for example, a computer-readable storage medium, and the program product includes the program in the sixteenth aspect or the program in the seventeenth aspect.

According to a nineteenth aspect, the present invention provides a reference signal sending method. A terminal receives symbol configuration information that is used to indicate a quantity of symbols in a slot and a symbol that is used to transmit a reference signal in the slot. The terminal sends the reference signal based on the symbol configuration message.

According to a twentieth aspect, the present invention provides a reference signal sending apparatus. The sending apparatus includes a processor and a transceiver. The transceiver receives, from a base station, symbol configuration information that is used to indicate a quantity of symbols in a slot and a symbol that is used to transmit a reference signal in the slot. The processor instructs the transceiver to send the reference signal based on the symbol configuration message.

According to a twenty-first aspect, the present invention provides a symbol configuration message sending method. A base station generates symbol configuration information that is used to indicate a quantity of symbols in a slot and a symbol that is used to transmit a reference signal in the slot. The base station sends the symbol configuration message to a terminal.

According to a twenty-second aspect, the present invention provides a symbol configuration message sending apparatus. The sending apparatus includes a processor and a transceiver. The processor generates symbol configuration information that is used to indicate a quantity of symbols in a slot and a symbol that is used to transmit a reference signal in the slot. The processor instructs the transceiver to send the symbol configuration message to a terminal.

In a possible implementation, a quantity of symbols that are used to transmit the reference signal in the slot is k, and k=n or k≤m. Herein, k and m are natural numbers, m<n, and n is a quantity of uplink transmission symbols in the slot.

According to a twenty-third aspect, an embodiment of the present invention provides a communications apparatus, including a processor and a transceiver. The processor performs functions of the processing unit in the twentieth aspect, and the transceiver performs functions of the transceiver unit in the twentieth aspect.

According to a twenty-fourth aspect, an embodiment of the present invention provides a communications apparatus, including a processor and a transceiver. The processor performs functions of the processing unit in the twenty-second aspect, and the transceiver performs functions of the receiving unit in the twenty-second aspect.

According to a twenty-fifth aspect, an embodiment of the present invention provides a program. When executed by a processor, the program is used for performing the method in the nineteenth aspect or any optional manner of the nineteenth aspect.

According to a twenty-sixth aspect, an embodiment of the present invention provides a program. When executed by a processor, the program is used for performing the method in the twenty-first aspect or any optional manner of the twenty-first aspect.

According to a twenty-seventh aspect, an embodiment of the present invention provides a program product, for example, a computer-readable storage medium, and the program product includes the program in the twenty-fifth aspect or the program in the twenty-sixth aspect.

BRIEF DESCRIPTION OF DRAWINGS

FIG. 7 is a schematic diagram of a frequency hopping order between different frequency domain units;

FIG. 8 is a schematic flowchart of sending a reference signal;

DESCRIPTION OF EMBODIMENTS

Figure 1:
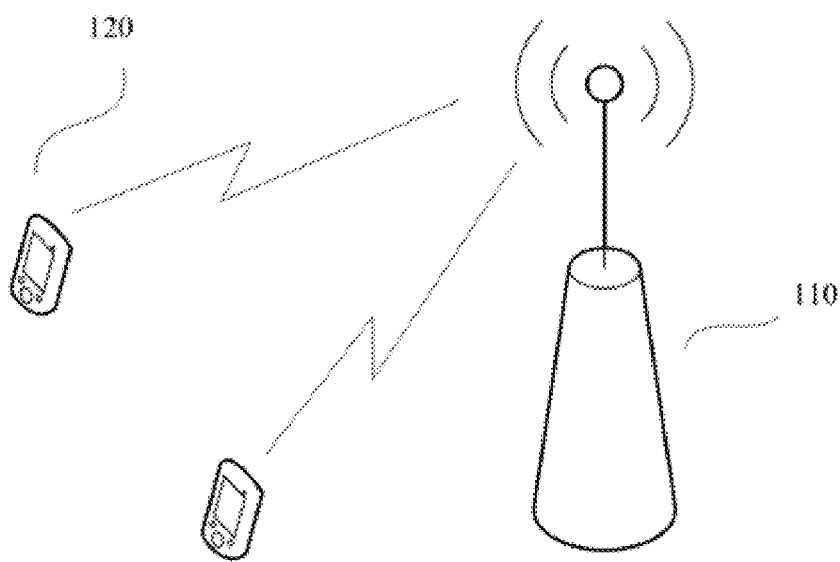
FIG. 1 is a schematic diagram of a communication scenario according to an embodiment of this application.

The following describes the technical solutions in the embodiments of this application with reference to the accompanying drawings. Apparently, the described embodiments are merely some but not all of the embodiments of this application.

In the following, some terms in this application are described, to help persons skilled in the art have a better understanding.

(1) A terminal 120 is also referred to as user equipment (User Equipment, UE) or mobile equipment (ME), and is a device providing voice and/or data connectivity for a user. For example, the terminal 120 is a handheld device or an in-vehicle device that has a wireless connection function. Common terminals 120 include, for example, a mobile phone, a tablet computer, a notebook computer, a palmtop computer, a mobile internet device (MID), and a wearable device such as a smart watch, a smart band, or a pedometer.

(2) A base station 110 is a network device that connects the terminal 120 to a wireless network. The base station 110 includes but is not limited to: a transmission reception point (Transmission Reception Point, TRP), an evolved NodeB (eNB), a radio network controller (RNC), a NodeB (NB), a base station controller (BSC), a base transceiver station (Base Transceiver Station, BTS), a home base station (for example, Home evolved NodeB or Home NodeB, HNB), a baseband unit (BBU), or a WiFi access point (AP).

A slot in the embodiments of the present invention may be a TTI and/or a time unit and/or a subframe and/or a mini-slot.

With the development of mobile internet, sub-6G spectrum resources become insufficient. To meet an increasing requirement for a communication rate and capacity, high-frequency radio resources with abundant spectrum resources become an important research direction of a wireless communications system. High-frequency communication is featured by a large transmission bandwidth. Therefore, a transmission bandwidth that is much larger than a sub-6G transmission bandwidth may occur. For example, a maximum transmission bandwidth supported by the sub-6G is 20 MHz, and an NR transmission bandwidth may be 100 MHz or even 400 MHz or the like. Therefore, a transmission bandwidth of a cell may be greater than a maximum bandwidth capability of the terminal 120. In this case, the terminal 110 can use only a part of the bandwidth. In other words, both measurement and transmission of the terminal 110 need to be performed on the part of the bandwidth. Therefore, the wireless communications system needs to support sending of an SRS on a part of the bandwidth (partial band) in a frequency hopping manner. The part of the bandwidth may also be referred to as a frequency domain unit. A plurality of frequency domain units form the transmission bandwidth of the base station 110, or form a part of the transmission bandwidth, or may be a bandwidth part. The bandwidth part is a segment of consecutive frequency domain resources configured by the base station for the terminal, and has a unique subcarrier spacing and a cyclic prefix. Alternatively, the bandwidth part may be configured based on user-specific signaling, for example, user-specific RRC signaling and/or MAC CE signaling and/or DCI. Different terminals 110 may support different transmission bandwidths. Therefore, the terminals 120 in a same cell of the base station support different bandwidths, and bandwidths required for measurement are different.

In a scenario with uplink and downlink channel reciprocity, the terminal 120 obtains a channel with a relatively good signal to interference plus noise ratio (SINR) or channel quality indicator (CQI) through downlink measurement. However, if channel state information (CSI) of the channel is quantified and then reported to the base station 110, channel precision is affected, and relatively large uplink control overheads are occupied. Therefore, the terminal 120 may send an SRS, so that the base station 110 obtains the uplink CSI by measuring the SRS and then determines CSI of a downlink channel based on the channel reciprocity. Because the terminal 120 has learned of a frequency band with good channel quality, the terminal 120 may send only an SRS for a specified frequency band instead of an SRS for the entire bandwidth, to reduce overheads and a delay. The terminal 120 may obtain an SRS measurement bandwidth through downlink channel measurement of the terminal 120 (for example, by using a channel state information-reference signal (CSI-RS) or based on an SRS measurement bandwidth indication of the base station 110 (the SRS measurement bandwidth may be determined by the base station 110 based on the CQI reported by the terminal 110).

SRS frequency hopping is supported in the existing LTE/LTE-A. For implementation of the SRS frequency hopping, a total measurement bandwidth is determined based on a cell-level configured bandwidth, and then a measurement bandwidth of each hop is configured based on user-level signaling. Details are shown in the following Tables 1 to 4. $N_{RB}^{UL}$ is a quantity of RBs of an uplink transmission bandwidth. Four tables are respectively provided based on different uplink transmission bandwidths. For this part of content, refer to 3GPP TS36.211.

TABLE 1

$m_{SRS,b}$ and $N_b$, $b = 0,1,2,3$, values for the uplink bandwidth of $6 \leq N_{RB}^{UL} \leq 40$

| SRS Bandwidth Configuration | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$m_{SRS,b}$ and $N_b$, $b = 0,1,2,3$, values for the uplink bandwidth of $40 < N_{RB}^{UL} \leq 60$

| SRS Bandwidth Configuration | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$m_{SRS,b}$ and $N_b$, $b = 0,1,2,3$, values for the uplink bandwidth of $60 < N_{RB}^{UL} \leq 80$

| SRS Bandwidth Configuration | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$m_{SRS,b}$ and $N_b$, and $b = 0,1,2,3$, values for the uplink bandwidth of $80 < N_{RB}^{UL} \leq 110$

| SRS Bandwidth Configuration | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Different transmission bandwidths correspond to different tables. In the tables, $C_{SRS}$ is a cell-level configured SRS bandwidth, and $B_{SRS}$ is a user-level configured SRS bandwidth (both are configured by using higher layer signaling). The terminal 110 may determine a total SRS frequency hopping bandwidth $m_{SRS,0}$ and a bandwidth $m_{SRS,B_{SRS}}$ of each hop based on the received $C_{SRS}$ and $B_{SRS}$. Herein, $N_b$ is a division granularity of a current-level frequency hopping bandwidth relative to a previous-level frequency hopping bandwidth. It can be learned from the tables that an SRS supports a maximum of four levels of division, namely, three times of division in total. For example, $80 < N_{RB}^{UL} \leq 110$, $C_{SRS}=1$, $B_{SRS}=3$, and a total frequency hopping bandwidth of the terminal 110 is 96 RBs. There are 96 RBs at level 0.

At level 1, 96 RBs are divided into two parts, and each bandwidth is 48 RBs. At level 2, 48 RBs are divided into two parts, and each bandwidth is 24 RBs. There are 2*2=4 bandwidths in total. At level 3, 24 RBs are divided into six parts, and each bandwidth is 4 RBs. There are 2*2*6=24 bandwidths in total. In other words, a bandwidth of each hop of the SRS is 4 RBs, and 24 hops in total are required to complete full bandwidth measurement.

A specific frequency hopping method is as follows: The base station 110 configures an initial position of the frequency hopping. For example, when there are n frequency hopping positions, the initial position is one of the n positions. For example, in the foregoing example, the base station 110 configures, by using higher-layer signaling, one of the 24 parts as the initial position of the frequency hopping, where each part is 4 RBs. In a subsequent frequency hopping process, the terminal 110 calculates, according to a frequency hopping rule specified in a protocol, an SRS frequency domain position of a current hop. The frequency domain position is one of the n frequency hopping positions. Herein, the frequency hopping position of each hop is determined based on a position of each of four levels, namely, positions of the four levels $n_b$, where b=0, 1, 2, 3. Whether the frequency hopping is performed for the SRS is configured based on a parameter $b_{hop} \in \{0, 1, 2, 3\}$. A value of the parameter is configured based on a UE-level RRC parameter srs-HoppingBandwidth. A specific frequency hopping method is as follows:

If the frequency hopping is not enabled for the SRS ($b_{hop} \geq B_{SRS}$) a value of a frequency position index $n_b$ is fixed to $n_b = \lfloor 4n_{RRC}/m_{SRS,b} \rfloor \mod N_b$ (unless RRC connection reconfiguration is performed). Herein, $n_{RRC}$ is configured based on freqDomainPosition (used for a periodic SRS) and freqDomainPosition-ap (used for an aperiodic SRS).

If the frequency hopping is enabled for the SRS ($b_{hop} < B_{SRS}$), a value of a frequency position index $n_b$ is $$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases}$$

Herein, $n_{RRC}$ is signaling configured by the base station 110, and is used to configure the initial frequency hopping position. Different values of $n_{RRC}$ lead to different frequency) domain positions of a first hop. $F_b(n_{SRS})$ is defined according to the following formula:

$$F_b(n_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2\prod_{b'=b_{hop}}^{b-1} N_{b'}} \right\rfloor & \text{if } N_b \text{ is even} \\ \lfloor N_b/2 \rfloor \lfloor n_{SRS} / \prod_{b'=b_{hop}}^{b-1} N_{b'} \rfloor & \text{if } N_b \text{ is odd} \end{cases}$$

$N_{b_{hop}} = 1$ (regardless of the value of $N_b$), and $$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, \\ \lfloor (n_f \times 10 + \lfloor n_s/2 \rfloor)/T_{SRS} \rfloor, \end{cases}$$

for 2-ms SRS periodicity of frame structure type 2 otherwise

Herein, $n_{SRS}$ is a quantity of UE-specific transmitted SRSs; $T_{SRS}$ and $T_{offset}$ are a period of a cell-level SRS symbol and an SRS subframe offset that are configured by the base station 110; $T_{offset\_max}$ is a maximum value of $T_{offset}$ in a specified SRS subframe offset configuration. It should be noted that a narrowband SRS does not necessarily mean that the frequency hopping is required. If the frequency hopping is not performed for the narrowband SRS, UE fixedly reports only SRS information of a specified segment of RBs.

A start frequency domain position of a channel in each hop of the SRS may be calculated based on the obtained $n_b$. For a calculation method, refer to the following formula. A start frequency domain position of SRS transmission is $$k_0^{(p)} = \bar{k}_0^{(p)} + \sum_{b=0}^{B_{SRS}} K_{TC} M_{sc,b}^{RS} n_b \cdot \bar{k}_0^{(p)}$$

indicates an offset that can be used for SRS transmission from a low frequency of an uplink transmission bandwidth, namely, a position of a first subcarrier that can be used for SRS transmission on a frequency band, or a position of a start subcarrier of an SRS bandwidth, where $\bar{k}_0^{(p)} = (\lfloor N_{RB}^{UL}/2 \rfloor - m_{SRS,0}/2) N_{SC}^{RB} + k_{TC}^{(p)}$.

$$\bar{k}_0^{(p)} = \begin{cases} (N_{RB}^{UL} - m_{SRS,0}^{max}) N_{sc}^{RB} + k_{TC}^{(p)} & \text{if } \frac{((n_f \mod 2) \cdot (2-N_{SP}) + n_{hf})}{\mod 2 = 0} \\ k_{TC}^{(p)} & \text{otherwise} \end{cases}$$

$$k_{TC}^{(p)} = \begin{cases} 1 - \bar{k}_{TC} & \text{if } n_{SRS}^{cs} \in \{4,5,6,7\} \text{ and } \tilde{p} \in \{1,3\} \text{ and } N_{ap} = 4 \\ \bar{k}_{TC} & \text{otherwise} \end{cases}$$

Herein, $n_f$ is a system frame number, and $n_{hf}$ means that a system frame consists of two half-frames. If UpPTS is located in a first half-frame, $n_{hf}$ is equal to 0. If UpPTS is located in a second half-frame, $n_{hf}$ is equal to 1. $N_{SP}$ is a quantity of switch points (switch point) from DL to UL in a system frame. For "Downlink-to-Uplink switch-point periodicity" of 5 ms, a value of $N_{SP}$ is 2. For "Downlink-to-Uplink switch-point periodicity" of 10 ms, a value of $N_{SP}$ is 1 (referring to Table 4.2-2 in 36.211). $N_{ap}$ is a quantity of antenna ports used for the SRS transmission. $\tilde{p}$ is an antenna port index. For details, refer to Table 5.2.1-1 in 36.211.

Herein, the formula is divided into two parts: $\bar{k}_0^{(p)}$ and $$\sum_{b=0}^{B_{SRS}} 2M_{sc,b}^{RS} n_b$$

for analysis. For a normal subframe, $\bar{k}_0^{(p)} = (\lfloor N_{RB}^{UL}/2 \rfloor - m_{SRS,0}/2) N_{SC}^{RB} + k_{TC}^{(p)}$. $(\lfloor N_{RB}^{UL}/2 \rfloor - m_{SRS,0}/2) N_{SC}^{RB}$ is used to exclude an area that is irrelevant to the SRS and that is used for PUCCH transmission at a low frequency of an uplink system. A value of $k_{TC}^{(p)}$ is 0 or 1 and is used to determine a to-be-used comb tooth. The figure shows an example of a normal subframe in which $N_{RB}^{UL} = 100$ and $C_{SRS} = 0$. It can be learned that, if the value of $k_{TC}^{(p)}$ is 0, $k_{TC}^{(p)} = 24$; or if the value of $k_{TC}^{(p)}$ is 1, $k_{TC}^{(p)} = 25$.

$$\sum_{b=0}^{B_{SRS}} 2M_{sc,b}^{RS} n_b$$

may be regarded as a selected part obtained after the SRS bandwidth is equally divided into N parts. Herein, $n_b$ is a frequency domain position index whose value remains unchanged unless the RRC connection reconfiguration is performed, and $n_{RRC}$ is configured based on freqDomainPosition (used for a periodic SRS) and freqDomainPosition-ap (used for an aperiodic SRS) and determines the value of $n_b$. Refer to FIG. 7 to FIG. 10. More specifically, $n_{RRC}$ determines a start frequency domain position of the SRS transmission.

For example, $N_{RB}^{UL}=100$, and $C_{SRS}=0$ (for simplicity, a scenario in which $B_{SRS}=3$ is omitted). A value of $n_0$ is fixed to 0 because a value of $N_0$ is fixed to 1. In addition, $2M_{sc,b}^{RS}$ is equal to one SRS bandwidth.

It can be learned from the foregoing description that different UEs may send SRSs by using a same subframe and a same RB set but using different $\bar{k}_{TC}$ for differentiation.

Embodiment 1

Figure 2:
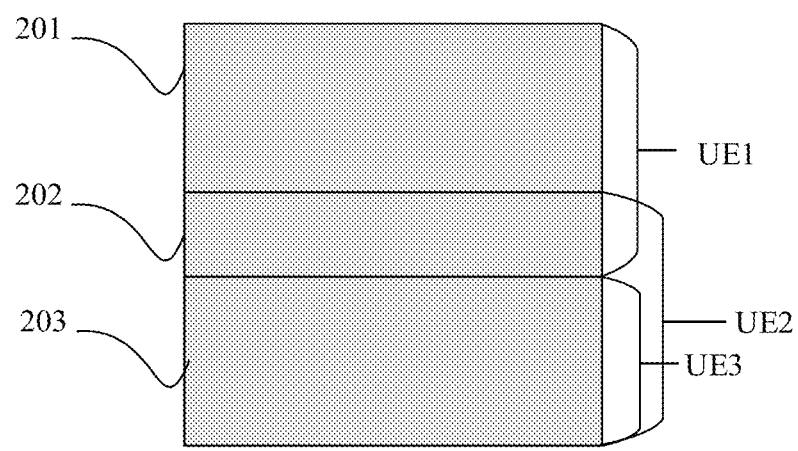
FIG. 2 is a schematic diagram of division of frequency domain units.

In this embodiment of the present invention, a base station 110 divides a transmission bandwidth supported by the base station 110 into a plurality of frequency domain units, and allocates the frequency domain units to terminals 120 served by the base station 110. Referring to FIG. 2, in an example, the transmission bandwidth of the base station 110 is divided into three frequency domain units 201, 202, and 203. A terminal UE1 supports the frequency domain units 201 and 202. A terminal UE2 supports the frequency domain units 202 and 203. A terminal UE3 supports the frequency domain unit 203. The frequency domain unit may be configured by the base station 110 by using cell-level signaling, for example, a broadcast message or a system message; or may be configured by using user-level signaling, for example, RRC signaling or MAC CE signaling. Different terminals may support a same frequency domain unit. Different frequency domain units do not overlap in frequency domain.

The base station 110 divides the transmission bandwidth of the base station 110 into the plurality of frequency domain units, and allocates the frequency domain units to the terminals 120 served by the base station 110. Different terminals 120 may support a same frequency domain unit. In the frequency domain unit, a reference signal is sent in the foregoing described frequency hopping manner. In this way, different terminals 120 support different bandwidths. In other words, different terminals 120 supports different frequency domain units. For example, UE2 supports the frequency domain units 202 and 203, and UE3 supports only the frequency domain unit 203. However, for the same frequency domain unit 202, the terminals UE2 and UE3 send reference signals on the same bandwidth (for example, the frequency domain unit 202) in the foregoing described frequency hopping manner. A bandwidth of the frequency domain unit is used to replace a cell-level configured bandwidth. In this way, in a frequency hopping process, the terminals 110 having different start positions do not jump to a same position at a same time.

A reference signal SRS in this embodiment of the present invention may be alternatively a demodulation reference signal (DMRS) or a channel state information-reference signal CSI-RS.

In an optional implementation, a cell-level reference signal frequency hopping bandwidth does not need to be configured in each frequency domain unit because the base station 110 can configure a bandwidth of the frequency domain unit. The cell-level reference signal frequency hopping bandwidth means a total frequency hopping bandwidth that is used by the terminal 120 to complete sending of the reference signal in one period. In this embodiment, the bandwidth of the frequency domain unit may be used as the cell-level reference signal frequency hopping bandwidth to perform frequency hopping and send the reference signal. Alternatively, a plurality of reference signal frequency hopping bandwidths may be configured in each frequency domain unit, and the reference signal is transmitted on each frequency hopping bandwidth in a frequency hopping manner. However, for ease of description, this embodiment of the present invention is described by using an example in which the cell-specific reference signal frequency hopping bandwidth does not need to be configured in each frequency domain unit. When a plurality of reference signal frequency hopping bandwidths are configured in one frequency domain unit, each configured reference signal frequency hopping bandwidth can be used as a frequency domain unit, so that the reference signal can be transmitted in the manner described in this embodiment of the present invention.

Figure 3:
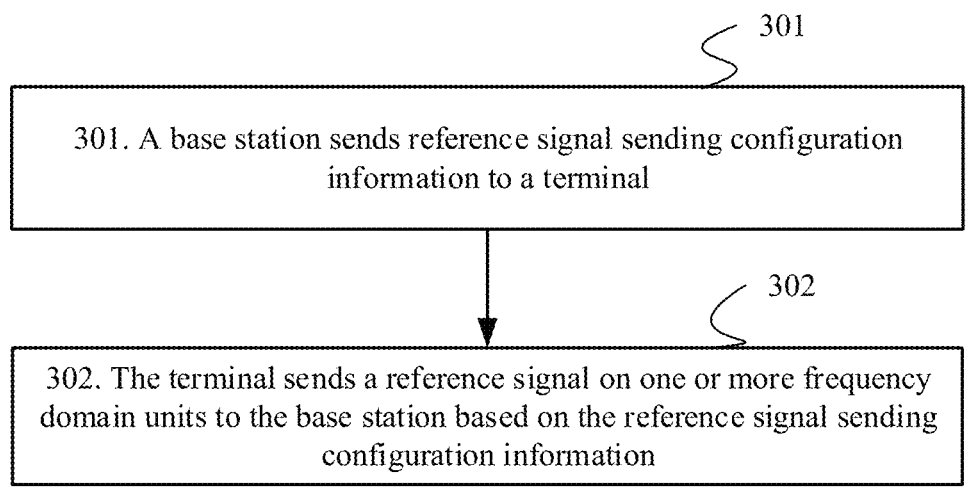
FIG. 3 is a schematic flowchart of sending a reference signal.

Referring to FIG. 3, in step 301, a base station 110 sends reference signal sending configuration information to a terminal 120. The reference signal sending configuration information instructs the terminal 120 to transmit a reference signal on one or more frequency domain units. The one or more frequency domain units and another frequency domain unit form a part of a transmission bandwidth supported by the base station 110. In step 302, the terminal 120 sends the reference signal on the one or more frequency domain units to the base station 110 based on the reference signal sending configuration information.

The reference signal sending configuration information includes an indication of a time-frequency resource that is used to transmit the reference signal. When the terminal 120 supports the plurality of frequency domain units, the reference signal sending configuration information may further include a first parameter. The first parameter indicates an order in which the terminal 120 transmits the reference signal on the plurality of frequency domain units. As shown in FIG. 2, the base station 110 instructs the terminal UE3 to transmit the reference signal on the frequency domain unit 202, and then transmits the reference signal on the frequency domain unit 203. Certainly, in another implementation, the order in which the terminal 120 transmits the reference signal on the plurality of frequency domain units may also use a preset rule. For example, the order of transmitting the reference signal on different frequency domain units is determined as a descending order or an ascending order of frequencies. The reference signal sending configuration information includes a second parameter that is used to indicate a correspondence between a time unit at which the terminal 120 sends the reference signal and a frequency domain unit on which the terminal 120 sends the reference signal. The correspondence determines a frequency domain unit on which the reference signal is initially sent within a reference signal sending period. Then, the reference signal is transmitted through frequency hopping on the frequency domain units based on the order indicated by the first parameter and the correspondence between the time unit and the frequency domain unit in the second parameter.

In an implementation, when the terminal 120 supports the plurality of frequency domain units, the base station 110 may further notify the terminal 120 of frequency domain units for transmitting the reference signal through frequency hopping. In this way, the terminal 120 may transmit the reference signal on only some frequency domain units instead of transmitting the reference signal on all the frequency domain units in the frequency hopping manner.

If the terminal 110 can transmit the reference signal on the plurality of frequency domain units simultaneously, the base station 110 may group the frequency domain units, and the reference signal may be sent by using each group in the manner disclosed in the foregoing embodiment. A grouping manner may be directly configured, or a quantity of groups may be configured. The frequency domain units supported by the terminal 120 are grouped based on factors such as a bandwidth that needs to be measured, a quantity of frequency domain units supported by the terminal 120, and/or a total quantity of frequency hopping segments for reference signal transmission. Frequency domain units in a same group may be consecutive or inconsecutive in frequency domain. Specifically, the base station 110 may deliver a grouping parameter to the terminal 120. The grouping parameter includes a quantity of frequency domain unit groups. The terminal 120 determines, based on the quantity of frequency domain unit groups and a quantity of frequency domain units supported by the terminal 120, frequency domain units included in the frequency domain unit group.

Optionally, to avoid collision, the base station 110 may further configure a blank frequency domain unit between different frequency domain units. The blank frequency domain unit means a frequency domain unit on which the reference signal is not transmitted when the frequency hopping is performed to jump to the frequency domain unit.

The reference signal configuration information includes one or more types of the following information: a reference signal transmission period, a reference signal bandwidth, a maximum reference signal bandwidth in the frequency domain unit, a start subcarrier position in which the reference signal is sent in the frequency domain unit, and a correspondence between a time domain resource and a frequency domain position of the reference signal. The reference signal transmission period means a time at which the terminal 120 completes reference signal transmission on all frequency domain units that need to be measured. The frequency domain units that need to be measured may be some of all the frequency domain units supported by the terminal 120. The terminal 120 may determine a time for transmitting the reference signal in a specified frequency domain unit, based on the reference signal transmission period, the quantity of frequency domain units, a bandwidth of the frequency domain unit or a bandwidth that is used to transmit the reference signal in the frequency domain unit, and a frequency hopping bandwidth of each hop. Specifically, if there are two frequency domain units that need to be measured, a bandwidth of a first frequency domain unit is 96 RBs, and a frequency hopping bandwidth of each hop is 4 RBs, frequency hopping needs to be performed 24 times. If a bandwidth of a second frequency domain unit is 128 RBs, and a frequency hopping bandwidth of each hop is 16 RBs, frequency hopping needs to be performed 8 times. In this way, a time required for the first frequency domain unit is twice that required for the second frequency domain unit. If the reference signal transmission period is T, the time for transmitting the reference signal on the first frequency domain unit is 2/3 T, and the time for transmitting the reference signal on the second frequency domain unit is 1/3 T. The terminal 120 determines, based on a transmission time on a frequency domain unit and a symbol used to transmit the reference signal, a symbol occupied by the reference signal on the frequency domain unit. Absolute values of time intervals for sending the reference signal on different frequency domain units are the same or have a multiplication relationship.

In an implementation, a frequency hopping time interval may be further set between the frequency domain units. In other words, after frequency hopping on a frequency domain unit is completed, frequency hopping on a next frequency domain unit is performed after a period of time. For example, the frequency hopping time interval may be configured based on information reported by the terminal 120. The frequency hopping time interval may be configured based on a radio frequency retuning time (RF retuning time).

Figure 14:
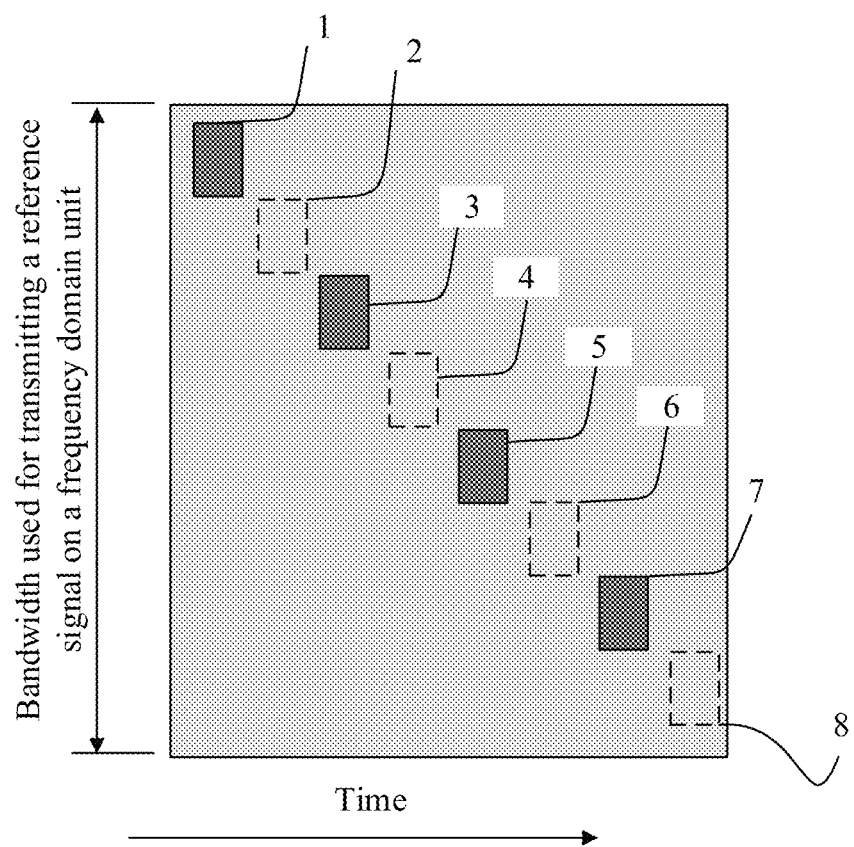
FIG. 14 is a schematic diagram of some second bandwidths in a frequency domain unit.

In an implementation, the base station may configure one or more frequency domain units for the terminal, and configure the reference signal configuration information for the one or more frequency domain units. The reference signal configuration information includes one or more types of the following information: a reference signal transmission period, a bandwidth used to transmit the reference signal in the frequency domain unit, a reference signal bandwidth on a symbol for sending the reference signal, and a correspondence between a time domain resource and a frequency domain position of the reference signal. The bandwidth used to transmit the reference signal in the frequency domain unit is a bandwidth that needs to be measured by using the reference signal in the frequency domain unit. The bandwidth is referred to as a first bandwidth. The bandwidth used to transmit the reference signal is different from the total bandwidth of the actually sent reference signal, and is a segment of consecutive bandwidths that include the total bandwidth of the actually transmitted reference signal. The bandwidth used to transmit the reference signal may be a frequency unit or a part of a frequency domain resource in a frequency unit. The reference signal bandwidth on the symbol for sending the reference signal is a reference signal bandwidth of each hop, and is referred to as a second bandwidth. The first bandwidth consists of one or more second bandwidths. In this implementation, the terminal 120 determines, based on a predefined rule or frequency hopping rule indication information sent by the base station, to send the reference signal in a reference signal period on some of the one or more second bandwidths forming the first bandwidth. The frequency hopping rule indication information may also be referred to as indication information that is used to instruct the terminal to transmit the reference signal on some of the second bandwidths. The indication information may be transmitted together with other information in the reference signal configuration information, for example, together with the reference signal transmission period, the bandwidth used to transmit the reference signal in the frequency domain unit, the reference signal bandwidth on the symbol for sending the reference signal, or the correspondence between the time domain resource and the frequency domain position of the reference signal. Optionally, the indication information may be used as independent information to be transmitted independently. Optionally, the reference signals are located on different symbols in the second bandwidths. In this solution, the terminal 120 sends the reference signal on some second bandwidths in the first bandwidth in the frequency hopping manner, to complete measurement of a part of the first bandwidth. Referring to FIG. 14, blocks in the figure represent eight frequency hopping positions 1, 2, 3, 4, 5, 6, 7, and 8 of a reference signal. In an example, the reference signal is sent in the frequency hopping positions 2, 4, 6, and 8, and is not sent in the frequency hopping positions 1, 3, 5, and 7. In this solution, a quantity of times for sending the reference signal in a reference signal period can be reduced, reference signal resource overheads can be reduced, and the reference signal period can be reduced. For a measurement result that changes slowly with a frequency change, for example, a measurement result obtained through beam selection, a measurement result obtained based on reference signal received power, or a measurement result obtained in a scenario in which a channel changes slowly with a frequency change, a measurement result of this implementation is similar to a measurement result obtained when the reference signal is transmitted on the second bandwidths forming the first bandwidth, and a performance loss is acceptable.

Optionally, the terminal 120 determines, based on a predefined rule or frequency hopping rule indication information sent by the base station, to send the reference signal in a reference signal period on some of the one or more second bandwidths forming the first bandwidth. The predefined information is that when a currently transmitted reference signal is used for beam sweeping, or a subcarrier spacing of a currently transmitted reference signal is greater than a reference subcarrier spacing or a subcarrier spacing that is of PUSCH transmission performed by the terminal on the frequency domain unit and that is configured by the base station, the terminal 120 determines to send the reference signal in a reference signal period on some of the one or more second bandwidths forming the first bandwidth. For example, the terminal 120 sends the reference signal on only second bandwidths with a same spacing therebetween. Specifically, if the first bandwidth is 32 RBs and each second bandwidth is 4 RBs, the first bandwidth consists of eight second bandwidths (referring to the frequency hopping positions 1, 2, 3, 4, 5, 6, 7, and 8 in FIG. 14). When the terminal 120 determines that the reference signal is used for beam sweeping, the terminal 120 selects second bandwidths {1, 3, 5, 7} to send the reference signal, or selects second bandwidths {2, 4, 6, 8} to send the reference signal. The base station may configure a start second bandwidth.

Optionally, the terminal 120 determines, based on a predefined rule or frequency hopping rule indication information sent by the base station, to send the reference signal in a reference signal period on some of the one or more second bandwidths forming the first bandwidth. The frequency hopping rule indication information sent by the base station is used to indicate at least one of the following: identifiers of some of the second bandwidths forming the first bandwidth; index information that is used to obtain the identifiers of some second bandwidths; a frequency domain spacing that is used to instruct to transmit the reference signal on some second bandwidths that meet the frequency domain spacing; and a sequence spacing of the second bandwidths forming the first bandwidth.

When the frequency hopping rule indication signal sent by the base station is used to indicate the identifiers of some of the second bandwidths forming the first bandwidth, the terminal transmits the reference signal on the second bandwidths corresponding to the identifiers of the second bandwidths. Specifically, if the first bandwidth is 32 RBs and each second bandwidth is 4 RBs, the first bandwidth consists of eight second bandwidths (referring to the frequency hopping positions 1, 2, 3, 4, 5, 6, 7, and 8 in FIG. 14). When the frequency hopping rule indication information sent by the base station is used to indicate identifiers {1, 4, 8} of some of the second bandwidths forming the first bandwidth, the terminal sends the reference signal on the second bandwidths {1, 4, 8}.

When the frequency hopping rule indication signal sent by the base station includes the index information, the terminal obtains identifiers of corresponding second bandwidths based on the index information, and sends the reference signal on the second bandwidths. Specifically, still referring to FIG. 14, if the first bandwidth is 32 RBs and each second bandwidth is 4 RBs, the first bandwidth consists of eight second bandwidths (referring to the frequency hopping positions 1, 2, 3, 4, 5, 6, 7, and 8 in FIG. 14). Some of the second bandwidths forming the first bandwidth may be divided into a first configuration {1, 3, 5, 7} and a second configuration {2, 4, 6, 8}. The configurations may be configured by using higher-layer signaling. When the index in the frequency hopping rule indication signal sent by the base station indicates the first configuration, the terminal sends the reference signal on the second bandwidths {1, 3, 5, 7}. Likewise, if the index information indicates the second configuration, the terminal sends the reference signal on the second bandwidths {2, 4, 6, 8}.

When the frequency hopping rule indication signal sent by the base station is used to indicate an identifier of a second bandwidth, from which transmission starts, of the second bandwidths forming the first bandwidth, and/or the second-bandwidth frequency domain spacing between the second bandwidths forming the first bandwidth, the terminal determines, based on the second bandwidth indicated by the identifier and the second-bandwidth frequency domain spacing between the second bandwidths forming the first bandwidth, some of the second bandwidths forming the first bandwidth with a same frequency domain spacing, and sends the reference signal on the second bandwidths. One of the identifier of the second bandwidth, from which transmission starts, of the second bandwidths forming the first bandwidth, and the second-bandwidth frequency domain spacing between the second bandwidths forming the first bandwidth may be predefined. Specifically, if the first bandwidth is 32 RBs and each second bandwidth is 4 RBs, the first bandwidth consists of eight second bandwidths (referring to the frequency hopping positions 1, 2, 3, 4, 5, 6, 7, and 8 in FIG. 14). When the frequency hopping rule indication signal sent by the base station is used to indicate that the identifier of the second bandwidth, from which transmission starts, of the second bandwidths forming the first bandwidth is 1 and that the second-bandwidth frequency domain spacing between the second bandwidths forming the first bandwidth is 2, the terminal sends the reference signal on the second bandwidths {1, 3, 5, 7}. For another example, when the frequency hopping rule indication signal sent by the base station is used to indicate that the identifier of the second bandwidth, from which transmission starts, of the second bandwidths forming the first bandwidth is 2 and that the second-bandwidth frequency domain spacing between the second bandwidths forming the first bandwidth is 2, the terminal sends the reference signal on the second bandwidths {2, 4, 6, 8}.

For another example, a correspondence between a frequency domain position of a reference signal and a time domain resource is $F=(f(n)*t1) \mod K$, where f is a function of a frequency domain position of a reference signal and a position of a time domain resource, F is position identifiers of the second bandwidths forming the first bandwidth, n is an identifier determined based on a time domain position of the reference signal, for example, a time domain sequence, K is a total quantity of second bandwidths forming the first bandwidth, and t1 is the second-bandwidth frequency domain spacing between the second bandwidths forming the first bandwidth. When it is configured that t=1, the terminal sends the reference signal on each second bandwidth forming the first bandwidth. When it is configured that t=2, the terminal sends the reference signal on second bandwidths at intervals of one second bandwidth in the second bandwidths forming the first bandwidth.

Optionally, when the frequency hopping rule indication signal sent by the base station is used to indicate the sequence spacing of the second bandwidths forming the first bandwidth, the terminal determines the frequency domain position of the second bandwidth based on the time domain interval and the correspondence between the frequency domain position of the reference signal and the time domain resource. For example, a correspondence between a frequency domain position of a reference signal and a time domain resource is F=(f(n*t2))mod K, where f is a function of a frequency domain position of a reference signal and a position of a time domain resource, F is position identifiers of the second bandwidths forming the first bandwidth, n is an identifier determined based on a time domain position of the reference signal, for example, a time domain sequence, K is a total quantity of second bandwidths forming the first bandwidth, and t2 is the sequence spacing of the second bandwidths forming the first bandwidth. When it is configured that t2=1, the terminal sends the reference signal on each second bandwidth forming the first bandwidth. When it is configured that t2=2, the terminal sends the reference signal on second bandwidths, of the second bandwidths forming the first bandwidth, at intervals of one second bandwidth in a sending order of the second bandwidths that is determined based on the correspondence between the frequency domain position of the reference signal and the time domain resource.

In an implementation, the base station 110 may further configure a quantity of periods in which the terminal 120 transmits the reference signal on one frequency domain unit. The quantity of periods represents a quantity of times that the terminal 120 completes sending of the reference signal on an entire frequency domain unit in the frequency domain unit. For example, if the terminal 120 supports two frequency domain units, a quantity of periods for one frequency domain unit may be configured as 3, and a quantity of periods for the other frequency domain unit is 1. In this way, the terminal 120 transmits the reference signal on the frequency domain unit in the frequency domain unit three times, and transmits the reference signal on the other frequency domain unit only once.

The maximum reference signal bandwidth in the frequency domain unit is a maximum bandwidth that needs to be measured by transmitting the reference signal on the frequency domain unit. For example, it is assumed that a bandwidth of the frequency domain unit 202 in FIG. 2 is 100 RBs, and a maximum bandwidth that needs to be measured by using the reference signal is 96 RBs. In the frequency domain unit, the reference signal needs to be transmitted on only the maximum reference signal bandwidth, namely, the bandwidth of 96 RBs.

A subcarrier position in which the reference signal is sent in the frequency domain unit is determined. Different terminals 120 may send reference signals on a same subframe and a same RB set. Different terminals 120 use different subcarriers in the RB. A time repetition factor (time-domain RePetition Factor, RPF) may be used to indicate subcarrier density when the reference signal is transmitted in frequency domain. A value of the RPF is a natural number. For example, if the value of the RPF is 4, it indicates that one subcarrier in every four subcarriers is used to transmit the reference signal. In other words, at a same time, four different terminals 120 each may occupy one of the four subcarriers to transmit the reference signal. The subcarrier position of the reference signal in this embodiment is used to notify the terminal 120 of a subcarrier for transmitting the reference signal.

Figure 4:
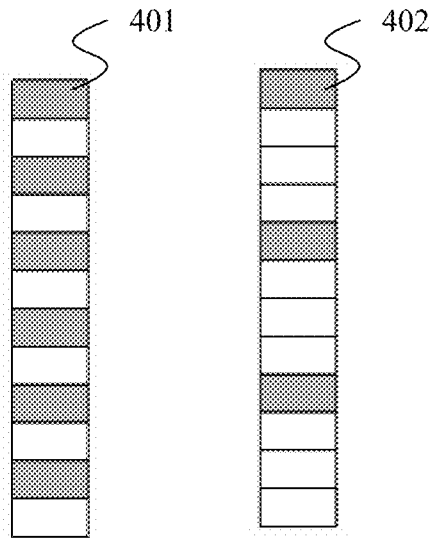
FIG. 4 is a schematic diagram of an RPF.

Referring to FIG. 4, 401 in the figure is a frequency domain bandwidth, and an RPF of the frequency domain bandwidth is 2. In other words, one subcarrier in every two subcarriers is used by the terminal 120 to transmit the reference signal. A blank block part indicates a subcarrier available for another terminal 120 to transmit the reference signal. Similarly, a value of an RPF of a bandwidth indicated by 402 in the figure is 4. In other words, one subcarrier in every four subcarriers is used by the terminal 120 to transmit the reference signal. A subcarrier position in which the terminal 120 sends the reference signal and that is sent by the base station 110 indicates a subcarrier position in a frequency band, so that the terminal 120 can transmit the reference signal in the subcarrier position.

The base station 110 may configure a frequency hopping bandwidth (a bandwidth of each hop) of the reference signal, a frequency hopping start position, a frequency hopping period, a cell-level symbol position, and an RPF for each frequency domain unit or a part of the frequency domain unit of the terminal 120. The reference signal configuration information may be used to configure reference signal transmission on a frequency domain unit, and may be used as a reference for obtaining reference signal configuration information for another frequency domain unit. To be specific, reference signal configuration information of another frequency domain unit is obtained based on the reference signal configuration information. The frequency domain unit herein may be used as a reference frequency domain unit. The reference frequency domain unit may be a real frequency domain unit, or may be a virtual frequency domain unit. The reference frequency domain unit is used to obtain the reference signal sending configuration information for frequency domain units supported by another terminal 120.

The reference signal sending configuration information includes a reference bandwidth of the reference signal, namely, a reference signal bandwidth at each time of frequency hopping. The terminal 120 obtains the reference signal bandwidth of the frequency domain unit based on the reference bandwidth of the reference signal, the SCS of the frequency domain unit, and the RPF value of the frequency domain unit. Specifically, for a frequency domain unit and a reference frequency domain unit, a small RPF value is required for a large subcarrier spacing. The RPF is inversely proportional to the subcarrier spacing. Therefore, the RPF value of the frequency domain unit may be obtained by using formula RPF=r_RPF*r_SCS/SCS. Herein, r_RPF is the RPF value of the reference frequency domain unit, and r_SCS is the subcarrier spacing of the reference frequency domain unit. After the RPF value of the frequency domain unit is obtained based on the reference frequency domain unit, the reference signal bandwidth of the frequency domain unit may be obtained according to r_RB/r_RPF*RPF. In the formula, r_RB is the reference bandwidth of the reference signal on the reference frequency domain unit, r_RPF is an RPF value of the reference frequency domain unit, and RPF is the RPF value of the frequency domain unit.

Certainly, the reference signal bandwidth of the frequency domain unit should not be greater than the bandwidth of the frequency domain unit or the maximum reference signal bandwidth in the frequency domain unit.

Figure 5:
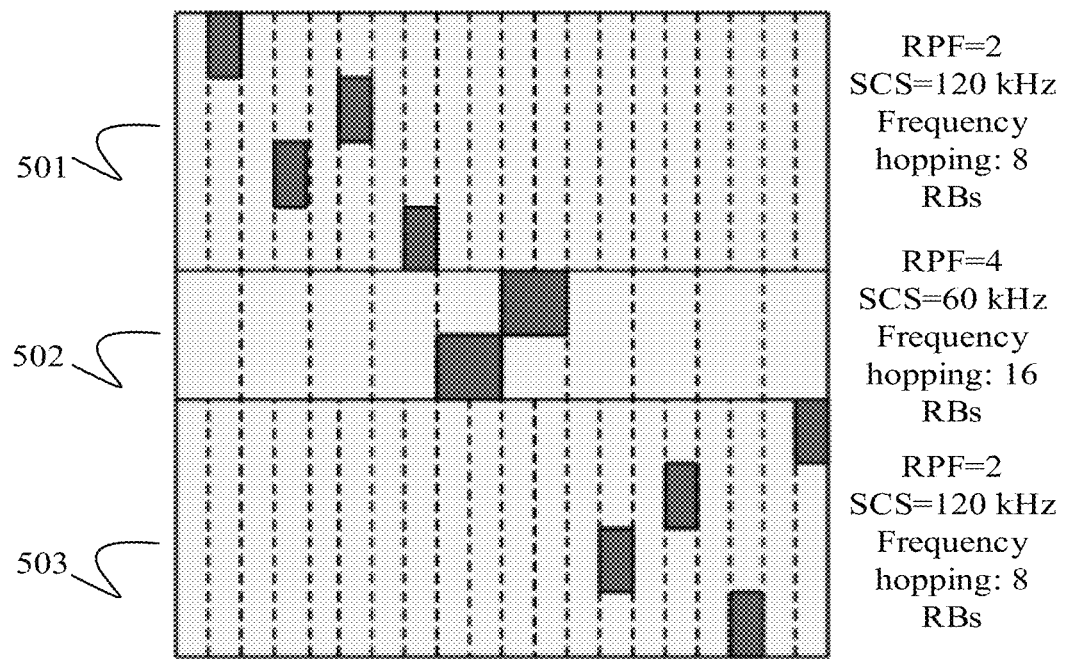
FIG. 5 is a schematic diagram of calculating a frequency hopping bandwidth.

In an example, refer to FIG. 5. In FIG. 5, it is assumed that a frequency domain unit 501 is used as the reference frequency domain unit, a reference RPF is 2, a reference SCS (Subcarrier Spacing) is 120 kHz, and a reference frequency hopping bandwidth is 8 RBs. The reference signal sending configuration information of a frequency domain unit 502 is calculated according to the foregoing formula. First, an SCS of the frequency domain unit 502 is 60 kHz, to determine that an RPF of the frequency domain unit 502 is 4. Then, that a frequency hopping bandwidth of the frequency domain unit 502 is 16 RBs may be determined according to formula r_RB/r_RPF*RPF. Similarly, reference signal sending configuration information of a frequency domain unit 503 can be calculated.

Figure 6:
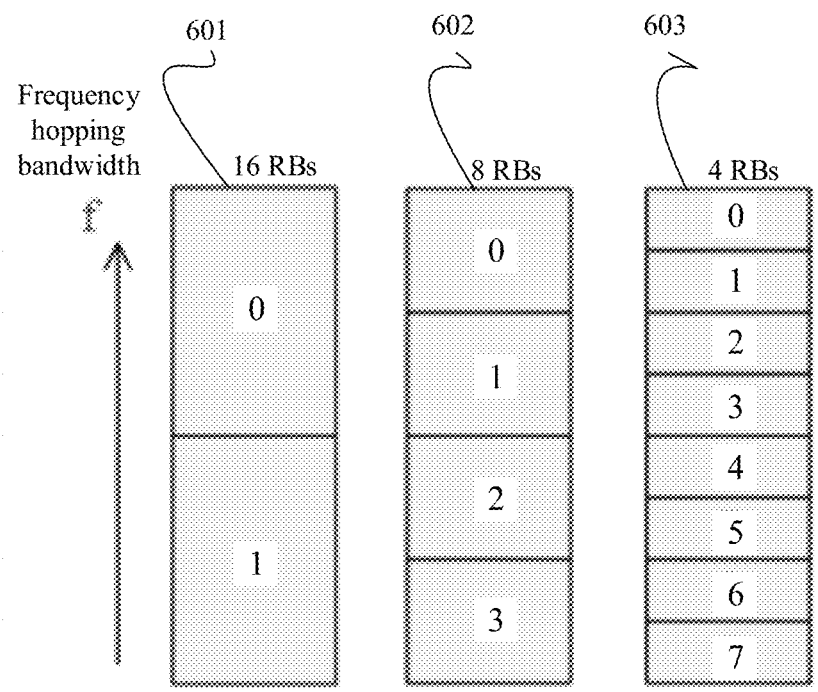
FIG. 6 is a schematic diagram of calculating an initial value of frequency hopping.

The reference signal sending configuration information includes an indication of a reference correspondence between the time domain resource and the frequency domain position of the reference signal. The terminal 120 determines the correspondence between the time domain resource and the frequency domain position of the reference signal in the frequency domain unit based on the reference correspondence between the time domain resource and the frequency domain position of the reference signal. Alternatively, the terminal 120 determines the correspondence between the time domain resource and the frequency domain position of the reference signal in the frequency domain unit based on the reference signal bandwidth in the frequency domain unit and the reference correspondence between the time domain resource and the frequency domain position of the reference signal. In an example, the frequency hopping start position is a frequency domain position from which the frequency hopping is performed on the frequency domain unit. The frequency hopping start position of the frequency domain unit may be obtained through calculation based on a reference initial value of the reference frequency domain unit and a ratio between the frequency hopping bandwidth of the frequency domain unit and the reference frequency hopping bandwidth of the reference frequency domain unit. Referring to FIG. 6, if a frequency hopping bandwidth of a frequency domain unit 601 is 16 RBs, and a frequency hopping bandwidth of a reference frequency domain unit 603 is 4 RBs, a ratio of the frequency hopping bandwidth of the frequency domain unit 601 to the frequency hopping bandwidth of the reference frequency domain unit 603 is 4. If the initial value is 5, 5/4 is rounded down to obtain the start position of the frequency domain unit, namely, a frequency domain position whose frequency domain number is 1 in the figure. A frequency hopping start position of a frequency domain unit 602 may be calculated in the same manner.

In a scenario in which the terminal 120 supports a plurality of frequency domain units, the reference signal is transmitted on different frequency domain units in the frequency hopping manner. The reference signal is transmitted on a current frequency domain unit to which the frequency hopping is performed to jump. After the frequency hopping position changes from another frequency domain unit to the current frequency domain unit, the frequency domain position of the reference signal in the current frequency domain unit should be determined based on both a time for sending the reference signal on the plurality of frequency domain units supported by the terminal 120 and a time for transmitting the reference signal on the current frequency domain unit. Referring to FIG. 7, for the terminal 120, there are four frequency hopping positions a, b, c, and d on a frequency domain unit 702 and two frequency hopping positions (not numbered) on a frequency domain unit 701. In a first frequency hopping period on the frequency domain unit 702 of the terminal 120, an order of the frequency hopping positions is a, b, c, and d. After the first frequency hopping period, the frequency hopping is performed to jump to the frequency domain unit 701 and then to the frequency domain unit 702 to transmit the reference signal in a second period. In the second period of the frequency hopping, a frequency hopping order in the second period is c, d, a, and b because the frequency domain unit 701 undergoes the frequency hopping twice.

In an implementation, alternatively, the base station 110 may not configure the frequency hopping between the frequency domain units, in other words, frequency hopping is performed independently on each frequency domain unit. The base station 110 implements orthogonality between frequency domain units by configuring a total frequency hopping period and configuring different time domain offset values. This implementation requires that different frequency domain units have a same period. When frequency domain units require different quantities of hops, resource wastes may occur.

Embodiment 2

In addition to sending a reference signal periodically or aperiodically, a terminal 120 may further transmit the reference signal in a multi-shot manner. Compared with the periodically sending manner, this reference signal sending manner is more flexible (because the sending is triggered by a dynamic signaling notification, for example, downlink control information (DCI) or a media access control control element (MAC CE)), and enables a smaller total quantity of sending times (because an end of the sending is determined based on a dynamic signaling notification or a pre-configured length). This reference signal sending manner enables a greater quantity of sending times when compared with one time of sending in the aperiodically sending manner. Therefore, the reference signal transmitted in the multi-shot manner may be used for frequency hopping measurement of a specified bandwidth, to obtain a measurement result of the specified bandwidth. The reference signal transmitted in the multi-slot manner may be further repeatedly sent on a same bandwidth by using different transmit beams or repeatedly received on a same bandwidth by using different receive beams, so that the base station 110 can measure channel quality corresponding to the different transmit beams or receive beams.

Referring to FIG. 8, in step 801, a base station 110 sends an indication of a plurality of reference signal resources and first indication information to the terminal 120. The indication of the plurality of reference signal resources includes information about the plurality of reference signal resources and grouping information of the plurality of reference signal resources. For example, the indication indicates that the plurality of reference signal resources belong to a first group. The first indication information indicates a quasi co-location (QCL) relationship between antenna ports of a reference signal transmitted on the plurality of reference signal resources in the first group. The QCL relationship means that a parameter of an antenna port may be defined based on a parameter of another antenna port.

In step 802, the terminal 120 sends a reference signal based on the first indication information and the indication of the plurality of reference signal resources.

A reference signal resource is a part of a resource in a slot. Information about a reference signal resource includes one or more types of the following: an indication of mapping the reference signal to a time-frequency resource, a reference signal period, a reference signal port, and a sequence indication of the reference signal. The indication of mapping the reference signal to the time-frequency resource includes at least one of the following: a reference signal bandwidth, an RPF indicating frequency domain density of the reference signal, and a start frequency domain position of the reference signal. The sequence indication of the reference signal includes a sequence root of the reference signal.

The information about the plurality of reference signal resources further includes a time offset between time-frequency resources to which the reference signal is mapped. The time offset is a time domain difference between a plurality of reference signal time domain resources.

For example, the QCL relationship may indicate that reference signals corresponding to antenna ports have a same parameter. The QCL relationship may further indicate that the terminal 120 may determine, based on a parameter of an antenna port, a parameter of another antenna port that has a QCL relationship with the antenna port. The QCL relationship may further indicate that two antenna ports have a same parameter, or the QCL relationship indicates that a parameter difference between two antenna ports is less than a specific threshold. The parameter may be at least one of a delay spread, a Doppler spread, a Doppler shift, an average delay, an average gain, an angle of arrival (AOA), an average AOA, an AOA spread, an angle of departure (AOD), an average angle of departure AOD, an AOD spread, a receive antenna spatial correlation parameter, a transmit beam, a receive beam, and a resource identifier. The beam includes at least one of the following: precoding, a weight sequence number, and a beam sequence number. An azimuth may be a decomposition value in different dimensions, or a combination of decomposition values in different dimensions. The antenna ports are antenna ports having different antenna port numbers, and/or antenna ports that have a same antenna port number and that are used to send or receive information at different time resources and/or frequency resources and/or code domain resources, and/or antenna ports that have different antenna port numbers and that are used to send or receive information at different time resources and/or frequency resources and/or code domain resources. The resource identifier includes a channel state information-reference signal (CSI-RS) resource identifier or a reference signal resource identifier, and is used to indicate a beam on a resource.

Specifically, in an example, the QCL relationship is at least one of the following: A same transmit beam is used for reference signals; different transmit beams are used for reference signals; a same receive beam is used for reference signals; and different receive beams are used for reference signals. The transmit beam corresponds to the AOD/AOD spread/average AOD/transmit end correlation in the QCL parameter. The receive beam corresponds to the AOA/AOA spread/average AOA/receive end correlation in the QCL parameter.

The base station 110 sends, to the terminal 120, configuration information that is used to indicate a quantity of symbols in a slot and a symbol that is used to transmit a reference signal in the slot. For example, a quantity of symbols that are used to transmit the reference signal in the slot is k, and k=n or k≤m. Herein, k and m are natural numbers, m<n, and n is a quantity of uplink transmission symbols in the slot. The message may be carried in RRC signaling or MAC CE signaling. For example, a value range of a symbol quantity k is {1, 2, 3, 4, n}. Optionally, when k is not equal to n, k may be represented as 2 raised to the power of an integer. For example, a value range of k is {1, 2, 4, n} or {1, 2, 4, 8, n}.

The configuration information may indicate one or more slot symbols. Different symbol quantities are indicated for different slot types. A quantity of symbols that are used to transmit a reference signal indicates different symbol sets for different slot types. The slot type is determined based on a quantity of uplink and/or downlink symbols in a slot, for example, an uplink-only slot, a slot of 2 downlink symbols plus 11 uplink symbols, and a slot of 11 downlink symbols plus 2 uplink symbols.

Figure 9:
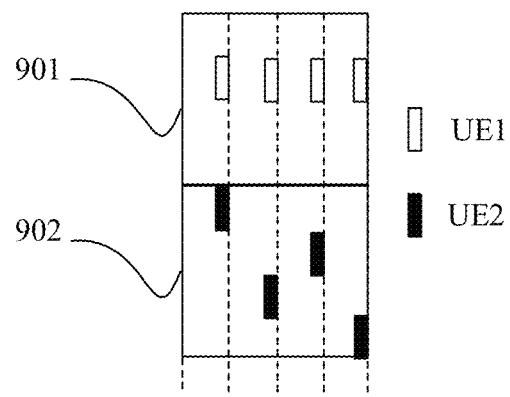
FIG. 9 is a schematic diagram of a reference signal resource group according to an embodiment.

As shown in FIG. 9, the plurality of reference signal resources belonging to the first group may be resources for transmitting a reference signal on a frequency domain unit. For example, for a frequency domain unit 901, a quantity of frequency domain positions is 1, and a quantity of repetition times is 4. For a frequency domain unit 902, a quantity of frequency domain positions is 4, and a quantity of repetition times is 1. The first indication information includes a frequency hopping order, a quantity of repetition times, and a sequence configuration of the plurality of reference signal resources. The base station 110 may trigger configuration on the plurality of resources (resource groups) by using DCI. Certainly, the quantity of repetition times may not be configured in the first indication information, and is set to 1 by default.

In the implementation of Embodiment 2, the following may be supported: The reference signal is sent on a combination of reference signal resources with different relationships therebetween.

Embodiment 3

A base station 110 sends a measurement resource, first configuration information, and second configuration information to a terminal 120. The first configuration information determines a first resource set. The second configuration information determines a corresponding receiving resource. The second configuration information determines one or more resources in the first resource set. The first configuration information further indicates a relationship between at least one resource in the first resource set and at least one measurement resource. This relationship is a quasi co-location relationship about a specified spatial parameter. The first configuration information is related to a result reported by the UE. An identifier indicated by the first configuration information is based on content reported by the UE.

Downlink is used as an example. In beam management, the base station 110 configures a downlink CSI-RS measurement resource and sends a measurement signal to UE by using different beams. The UE measures a corresponding resource and reports a corresponding measurement result to the base station 110. The base station 110 determines, based on the reported content, a beam used by a corresponding channel (a control channel or a data channel) and a beam used by a signal. The base station 110 uses the second configuration information to notify the UE, so that the UE determines a receive beam to be used based on an indication of the second configuration information. Signaling of the indication may be indicated by using information about a QCL assumption. The QCL assumption means that the beam used by the base station 110 to send the current channel and a transmit beam of a specified resource for the CSI-RS measurement are QCL on an assumption about a spatial parameter. In other words, the base station 110 sends the current channel or signal by using a same beam as a transmit beam of a specified CSI-RS. Based on such information, the UE may receive the current channel or signal by using a previous receive beam.

Because there may be a plurality of configured CSI-RS measurement resources, distinguishing based on a quantity of resources may cause excessively large overheads for an indication. For example, if 32 resources are configured for downlink scanning, 5 bits are needed for an indication. To reduce the overheads for the indication, a small resource set used for the indication may be established. For example, if that there are four elements in total in a resource set is defined, 2 bits are used for the indication. In this way, the overheads for the indication are reduced. The set may be established and updated by using the first configuration information.

Content of the resource set is updated based on a report from the UE after each time of measurement. A quantity of reports and content of the reports may change each time the UE sends the reports. The base station 110 updates the resource set based on the quantity of reports and the content of the reports. In addition, the gNB needs to send the updated information to the UE in time by using the first configuration information, to ensure that the gNB and the UE have a consistent understanding for the indication information. A specified relationship exists between the information indicated by the first configuration information and a report result. For example, if there are four pieces of report content, the indication needs to use only 2 bits to determine one of the four pieces of report content, to reduce overheads. If the gNB finds that there is no required beam in the report result, the resource set may be not updated.

Each indication identifier in the resource set is associated with a resource for previous specified measurement. For example, it is assumed that the resource set includes four element flags {00, 01, 10, 11}. The first element 00 is associated with a beam a in previous specified measurement. After current measurement and reporting, the base station 110 finds that quality of a beam b is better than that of the previous beam a. In this case, the base station 110 may update the beam associated with the element 00 in the set. The base station 110 sends the first configuration information to update information, so that the UE can update information about a beam associated with the resource set of the UE. To be specific, the beam associated with the element 00 is updated to b. In this way, when 00 is indicated for a next time, the UE understands that 00 is associated with the beam b.

The set may be configured based on a channel. In other words, different sets are maintained for different channels. For example, a set is maintained for each channel of a PDCCH/PDSCH/PUCCH/PUSCH. A control channel may correspond to a relatively wide beam, and a data channel may correspond to a relatively narrow beam. Alternatively, a plurality of channels may share one set, and the set includes a wide beam and a narrow beam. Alternatively, a set may be maintained in uplink, and a set may be maintained in downlink. If beam reciprocity exists, a set may be maintained in both uplink and downlink. Beams associated with element flags in the set may have different relationships. For example, two beams corresponding to the element 00 and the element 01 may have a relatively small correlation. In this way, robust beam transmission can be better implemented. When communication is interrupted because one beam is blocked, the other beam is used for communication recovery.

The method may also be applied in uplink. In uplink transmission, resource measurement is performed by configuring an SRS in uplink. The UE sends a measurement signal to the base station 110, and the base station 110 notifies the UE of a to-be-used transmit beam. For example, a transmit beam of the PUCCH/PUSCH and a beam for sending SRS previously are QCL with respect to a spatial parameter. Alternatively, in this case, a resource set may be maintained for the base station 110 and the UE. Each beam corresponding to an element in the resource set and a beam of a specified measurement resource are QCL. Each indication needs to indicate only a specified element in the indication set.

In an implementation, the terminal 110 receives the first configuration information sent by the base station 110. The first configuration information is used to determine a first resource or a set of first resources for transmitting a first signal. The terminal 110 receives the second configuration information sent by the base station 110. The second configuration information is used to indicate a second resource or a set of second resources for transmitting a second signal. The base station 110 sends third configuration information that is used to indicate that the second signal and the first signal have an association reference signal feature. The association reference signal feature is that a port of a first reference signal and a port of a second reference signal have a QCL relationship, or have a same spatial feature, or corresponding uplink and downlink spatial features. The terminal 110 sends or receives the second reference signal based on the first reference signal and the association reference signal feature. The spatial feature includes at least one of the following: an angle of arrival (AOA), an average AOA, an AOA spread, an angle of departure (AOD), an average angle of departure AOD, an AOD spread, a receive antenna spatial correlation parameter, a transmit beam, and a receive beam. The QCL relationship means that a same parameter exists in reference signals corresponding to antenna ports, or the QCL relationship means that a user can determine, based on a parameter of an antenna port, a parameter of another antenna port having the QCL relationship with the antenna port, or the QCL relationship means that two antenna ports have a same parameter, or the QCL relationship means that a difference between parameters of two antenna ports is less than a specified threshold. The parameter may be at least one of a delay spread, a Doppler spread, a Doppler shift, an average delay, an average gain, an angle of arrival (AOA), an average AOA, an AOA spread, an angle of departure (AOD), an average angle of departure AOD, an AOD spread, a receive antenna spatial correlation parameter, a transmit beam, a receive beam, and a resource identifier. The beam includes at least one of the following: precoding, a weight sequence number, and a beam sequence number. An azimuth may be a decomposition value in different dimensions, or a combination of decomposition values in different dimensions. The antenna ports are antenna ports having different antenna port numbers, and/or antenna ports that have a same antenna port number and that are used to transmit or receive information at different time resources and/or frequency resources and/or code domain resources, and/or antenna ports that have different antenna port numbers and that are used to transmit or receive information at different time resources and/or frequency resources and/or code domain resources. The resource identifier includes a channel state information-reference signal (CSI-RS) resource identifier or an SRS resource identifier, and is used to indicate a beam on a resource.

The first resource further includes at least one of the following: a port, a time domain resource, a frequency domain resource, and a code domain resource of the first reference signal. The second resource further includes at least one of the following: a port, a time domain resource, a frequency domain resource, and a code domain resource of the second reference signal.

The first reference signal may be a first uplink reference signal and/or a first downlink reference signal. The first uplink reference signal includes at least one of the following: a sounding reference signal, a physical layer random access channel, a preamble sequence, and an uplink demodulation reference signal. The first downlink reference signal includes at least one of the following: a primary synchronization signal, a secondary synchronization signal, a demodulation reference signal, a channel state information-reference signal, a mobility reference signal, and a beam reference signal.

Optionally, a candidate set of first reference signals may include one or more types of reference signals in first uplink reference signals, or one or more types of reference signals in first downlink reference signals, or both one or more types of reference signals in first uplink reference signals and one or more types of reference signals in first downlink reference signals. For example, the candidate set of first reference signals may include an SRS resource, or include an SRS resource and a PRACH resource. For another example, the candidate set of first reference signals includes a CSI-RS resource, or includes a CSI-RS resource and a synchronization signal resource. For another example, the candidate set of first reference signals includes an SRS resource and a CSI-RS resource. The second reference signal may be a second uplink reference signal and/or a second downlink reference signal. The second uplink reference signal includes at least one of the following: a sounding reference signal, a physical layer random access channel, a preamble sequence, and an uplink demodulation reference signal. The second downlink reference signal includes at least one of the following: a primary synchronization signal, a secondary synchronization signal, a demodulation reference signal, a channel state information-reference signal, a mobility reference signal, and a beam reference signal.

Specifically, the following implementations may be included. Scenario 1: If the first reference signal is the first uplink reference signal, and the second reference signal is the second uplink reference signal, when the third configuration information indicates that a QCL relationship between the first reference signal and the second reference signal includes a same AOD, or a same spatial feature includes a same AOD, it is considered that the first reference signal and the second reference signal correspond to a same transmit beam on a user end. For example, if the first reference signal and the second reference signal are SRSs, the user determines, based on the third configuration information, that the two reference signals correspond to the same transmit beam on the user end.

Scenario 2: If the first reference signal is the first uplink reference signal, and the second reference signal is the second uplink reference signal, when the third configuration information indicates that a QCL relationship between the first reference signal and the second reference signal includes a same AOA, or a same spatial feature includes a same AOA, it is considered that the first reference signal and the second reference signal correspond to a same receive beam on a base station end. For example, if the first reference signal and the second reference signal are SRSs, the user determines, based on the third configuration information, that the two reference signals correspond to the same receive beam.

Scenario 3: If the first reference signal is the first uplink reference signal, and the second reference signal is the second downlink reference signal, when the third configuration information indicates that a QCL relationship between the first reference signal and the second reference signal includes that the user determines an AOA of the second reference signal based on an AOD of the first reference signal, or spatial features corresponding to uplink and downlink include that an AOD of the first reference signal corresponds to an AOA of the second reference signal, it is considered that a user-end transmit beam of the first reference signal corresponds to a user-end receive beam of the second reference signal. For example, if the first reference signal is an SRS, and the second reference signal is a CSI-RS, the user determines, based on the third configuration information, that a transmit beam of the SRS corresponds to a receive beam of the CSI-RS.

Scenario 4: If the first reference signal is the first uplink reference signal, and the second reference signal is the second downlink reference signal, when the third configuration information indicates that a QCL relationship between the first reference signal and the second reference signal includes that the user determines an AOD of the second reference signal based on an AOA of the first reference signal, or spatial features corresponding to uplink and downlink include that an AOA of the first reference signal corresponds to an AOD of the second reference signal, it is considered that a base station-end receive beam of the first reference signal corresponds to a base station-end transmit beam of the second reference signal. For example, if the first reference signal is an SRS, and the second reference signal is a CSI-RS, the user determines, based on the third configuration information, that a receive beam of the SRS corresponds to a transmit beam of the CSI-RS.

Scenario 5: If the first reference signal is the first downlink reference signal, and the second reference signal is the second uplink reference signal, when the third configuration information indicates that a QCL relationship between the first reference signal and the second reference signal includes that the user determines an AOA of the second reference signal based on an AOD of the first reference signal, or spatial features corresponding to uplink and downlink include that an AOD of the first reference signal corresponds to an AOA of the second reference signal, it is considered that a base station-end transmit beam of the first reference signal corresponds to a base station-end receive beam of the second reference signal. For example, if the first reference signal is a CSI-RS, and the second reference signal is an SRS, the user determines, based on the third configuration information, that a transmit beam of the CSI-RS corresponds to a receive beam of the SRS.

Scenario 6: If the first reference signal is the first downlink reference signal, and the second reference signal is the second uplink reference signal, when the third configuration information indicates that a QCL relationship between the first reference signal and the second reference signal includes that the user determines an AOD of the second reference signal based on an AOA of the first reference signal, or spatial features corresponding to uplink and downlink include that an AOA of the first reference signal corresponds to an AOD of the second reference signal, it is considered that a user-end receive beam of the first reference signal corresponds to a user-end transmit beam of the second reference signal. For example, if the first reference signal is a CSI-RS, and the second reference signal is an SRS, the user determines, based on the third configuration information, that a receive beam of the CSI-RS corresponds to a transmit beam of the SRS.

Scenario 7: If the first reference signal is the first downlink reference signal, and the second reference signal is the second downlink reference signal, when the third configuration information indicates that a QCL relationship between the first reference signal and the second reference signal includes a same AOD, or a same spatial feature includes a same AOD, it is considered that the first reference signal and the second reference signal correspond to a same transmit beam on a base station end. For example, if the first reference signal and the second reference signal are CSI-RSs, the user determines, based on the third configuration information, that the two reference signals correspond to the same transmit beam on the base station end.

Scenario 8: If the first reference signal is the first downlink reference signal, and the second reference signal is the second downlink reference signal, when the third configuration information indicates that a QCL relationship between the first reference signal and the second reference signal includes a same AOA, or a same spatial feature includes a same AOA, it is considered that the first reference signal and the second reference signal correspond to a same receive beam on a user end. For example, if the first reference signal and the second reference signal are CSI-RSs, the user determines, based on the third configuration information, that the two reference signals correspond to the same receive beam.

In an implementation, the first reference signal may be sent before the third configuration information, or the third configuration information may be sent before the first reference signal. If the third configuration information is sent before the first reference signal, the third configuration information is used to indicate a correspondence between resources for sending the first reference signal and the second reference signal. Specifically, the third configuration information is used to indicate a correspondence between a first resource and a second resource, a correspondence between a first resource set and a second resource, a correspondence between a first resource and a second resource set, or a correspondence between a first resource set and a second resource set. In this case, the third configuration information includes an identifier of the first resource and an identifier of the second resource, or an identifier in a candidate set of first resources and an identifier of the second resource, or an identifier of the first resource and an identifier in a candidate set of second resources, or an identifier in a candidate set of first resources and an identifier in a candidate set of second resources.

In an implementation, the candidate set of first resources includes one or more first resources that are configured by the base station and/or reported by the user. The candidate set of second resources includes one or more second resources that are configured by the base station and/or reported by the user.

In an implementation, the first reference signal is the first downlink reference signal, and ports of the first reference signals on first reference signal resources in a resource set of first reference signals have a QCL relationship or have a same spatial feature. In addition, the second reference signal is the second uplink reference signal, and ports of the second reference signals on second reference signal resources in a resource set of second reference signals have a QCL relationship or have a same spatial feature. A parameter in the QCL relationship includes an AOD, or the spatial feature includes an AOD. In this case, the ports of the second reference signals on the plurality of second reference signal resources and a port of the first reference signal on a first reference signal resource have a corresponding QCL relationship or spatial features corresponding to uplink and downlink. For example, AODs of the ports of the second reference signals on all the second reference signal resources correspond to an AOA of a port of the first reference signal on a first reference signal resource. The user measures and selects the first reference signal resource based on the first reference signal received in downlink. For example, if the first reference signal is a CSI-RS, and the second reference signal is an SRS, the user selects a receive beam of a CSI-RS based on a measurement status of the CSI-RS, and uses a transmit beam corresponding to the selected receive beam of the CSI-RS to perform SRS sending on all SRS resources.

In an implementation, the first reference signal is the first uplink reference signal, and ports of the first reference signals on first reference signal resources in a resource set of first reference signals have a QCL relationship or have a same spatial feature. In addition, the second reference signal is the second downlink reference signal, and ports of the second reference signals on second reference signal resources in a resource set of second reference signals have a QCL relationship or have a same spatial feature. A parameter in the QCL relationship includes an AOD, or the spatial feature includes an AOD. In this case, the ports of the second reference signals on the plurality of second reference signal resources and a port of the first reference signal on a first reference signal resource have a corresponding QCL relationship or spatial features corresponding to uplink and downlink. For example, AODs of the ports of the second reference signals on all the second reference signal resources correspond to an AOA of a port of the first reference signal on a first reference signal resource. The base station measures and selects the first reference signal resource based on the first reference signal received in uplink. For example, if the first reference signal is an SRS, and the second reference signal is a CSI-RS, the base station selects a receive beam of the SRS based on a measurement status of the SRS, and uses a transmit beam corresponding to the selected receive beam of the SRS to perform CSI-RS sending on all CSI-RS resources.

The AOA in the foregoing embodiment may include an average AOA and/or an AOA spread and/or a receive-end spatial correlation. The AOD in the foregoing embodiment may include an average AOD and/or an AOD spread and/or a transmit-end spatial correlation.

Figure 10:
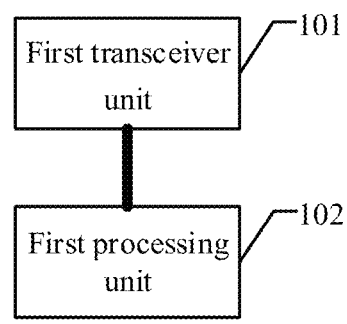
FIG. 10 is a schematic structural diagram of a base station according to an embodiment of this application.
Figure 11:
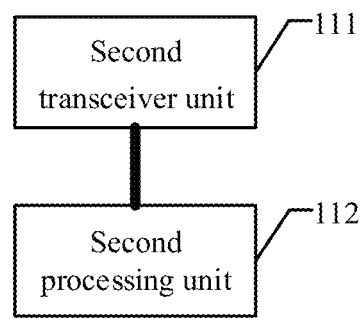
FIG. 11 is a schematic structural diagram of a terminal according to an embodiment of this application.

Referring to FIG. 10, a base station 110 that performs the method in Embodiment 1 and the method in Embodiment 2 includes a first processing unit 102 and a first transceiver unit 101. The first processing unit 102 is configured to generate a message such as a reference signal configuration message or a symbol configuration message in step 301 and step 801 performed by the base station 110. The first transceiver unit 101 is configured to send, to a terminal 120, the reference signal configuration message or the symbol configuration message generated by the first processing unit 102. Further referring to FIG. 11, a terminal 120 includes a second transceiver unit 111 and a second processing unit 112. The second transceiver unit 111 is configured to receive a reference signal configuration message or a symbol configuration message from a base station 110. The second processing unit 112 is configured to send a reference signal based on the reference signal configuration message received by the second transceiver unit 111 in step 302 and step 802.

It should be understood that division of the units of the foregoing communications apparatus is merely division of logical functions. During actual implementation, all or some of the units may be integrated into a physical entity, or may be physically separated. In addition, the units may be implemented in a form of software invoked by a processing element or in a form of hardware only; or some units may be implemented in a form of software invoked by a processing element, and the other units may be implemented in a form of hardware. For example, the first processing unit 102 or the second processing unit 112 may be a separately disposed processing element, or may be integrated in a chip of the base station 110 or a chip of the terminal 120, for example, a baseband chip. In addition, the first processing unit 102 or the second processing unit 112 may be stored in a memory of the base station 110 or a memory of the terminal 120 in a program form, so that a processing element of the base station 110 or a processing element of the terminal 120 may invoke and perform functions of the processing unit. Implementation of another unit is similar to that of the processing unit. The terminal 120 may receive, by using an antenna, information sent by the base station 110. The information is processed by a radio frequency apparatus and then sent to a baseband apparatus. The first and the second transceiver units may receive/send, through an interface between the radio frequency apparatus and the baseband apparatus, information transmitted by the base station 110 or the terminal 120. In addition, all or some of the units of the base station 110 or the terminal 120 may be integrated, or may be implemented independently. The processing element herein may be an integrated circuit having a signal processing capability. In an implementation process, steps of the foregoing method or the foregoing units may be implemented by using an integrated logic circuit of hardware in a processor element, or by using an instruction in a form of software.

For example, the first processing unit or the second processing unit may be one or more integrated circuits configured to implement the foregoing method, for example, one or more application specific integrated circuits (ASIC), or one or more microprocessors (DSP), or one or more field-programmable gate arrays (FPGA). For another example, when one of the foregoing units is implemented in a form of scheduling a program by a processing element, the processing element may be a baseband processor, or a general-purpose processor such as a central processing unit (CPU), or another processor that can invoke the program. For another example, the units may be integrated and implemented in a form of a system-on-a-chip (SOC).

Figure 12:
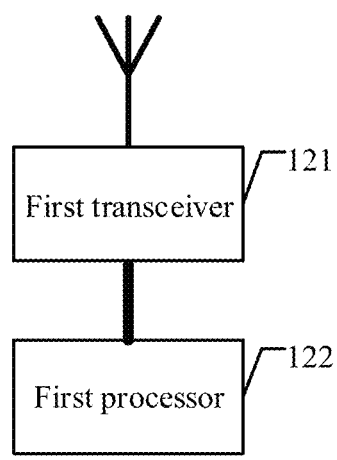
FIG. 12 is a schematic structural diagram of a base station according to an embodiment of this application.

Referring to FIG. 12, a base station 110 includes a first transceiver 121 and a first processor 122. The first processor 122 may be a general-purpose processor, for example but not limited to, a central processing unit (CPU); or may be a dedicated processor, for example but not limited to, a baseband processor, a digital signal processor (Digital Signal Processor, DSP), an application specific integrated circuit (ASIC), or a field-programmable gate array (FPGA). In addition, the first processor 122 may be alternatively a combination of a plurality of processors. Particularly, in the technical solutions provided in this embodiment of the present invention, the first processor 122 may be configured to perform, for example, steps performed by the first processing unit 102. The first processor 122 may be a processor specially designed to perform the foregoing steps and/or operations, or may be a processor that performs the foregoing steps and/or operations by reading and executing an instruction stored in a memory.

The first transceiver 121 includes a transmitter and a receiver. The transmitter is configured to send a signal by using at least one of a plurality of antennas. The receiver is configured to receive a signal by using at least one of the plurality of antennas. Particularly, in the technical solutions provided in this embodiment of the present invention, the first transceiver 121 may be specifically configured to perform, for example, functions of the first transceiver unit by using the plurality of antennas.

Figure 13:
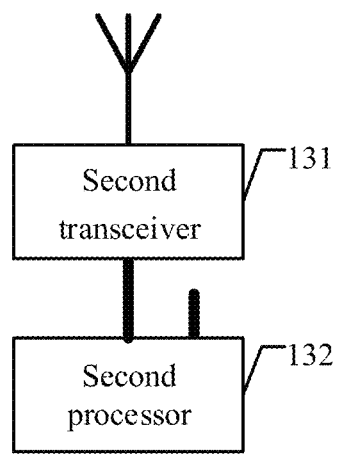
FIG. 13 is a schematic structural diagram of a terminal according to an embodiment of this application.

FIG. 13 is a structural diagram of a terminal 120. The terminal 120 includes a second processor 132 and a second transceiver 131. The second processor 132 may be a general-purpose processor, for example but not limited to, a central processing unit (CPU); or may be a dedicated processor, for example but not limited to, a digital signal processor (DSP), an application specific integrated circuit (ASIC), or a field-programmable gate array (FPGA). In addition, the second processor 132 may be alternatively a combination of a plurality of processors. Particularly, in the technical solutions provided in this embodiment of the present invention, the second processor 132 may be configured to perform, for example, steps and functions that are performed by the second processing unit. The second processor 132 may be a processor specially designed to perform the foregoing steps and/or operations, or may be a processor that performs the foregoing steps and/or operations by reading and executing an instruction stored in a memory.

The second transceiver 131 includes a transmitter and a receiver. The transmitter is configured to send a signal by using at least one of a plurality of antennas. The receiver is configured to receive a signal by using at least one of the plurality of antennas. Particularly, in the technical solutions provided in this embodiment of the present invention, the second transceiver 131 may be specifically configured to perform by using the plurality of antennas, for example, steps and functions that are performed by the second transceiver unit 111.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A reference signal sending method, the method comprising:
receiving, by a terminal, reference signal sending configuration information from a base station, wherein the reference signal sending configuration information instructs the terminal to transmit a reference signal on one or more frequency domain units, wherein the one or more frequency domain units and another frequency domain unit form a part of a transmission bandwidth supported by the base station, wherein the reference signal sending configuration information comprises a first parameter and a second parameter, wherein the first parameter indicates an order in which the terminal transmits the reference signal on the one or more frequency domain units, and wherein the second parameter indicates a correspondence between a time unit at which the terminal sends the reference signal and a frequency domain unit on which the terminal sends the reference signal, wherein the reference signal sending configuration information comprises a grouping parameter that is used to instruct the terminal to group the one or more frequency domain units, and wherein the grouping parameter comprises a quantity of frequency domain unit groups;

determining, by the terminal and based on the one or more frequency domain units and the quantity of frequency domain unit groups indicated in the grouping parameter, frequency domain units included in each of the frequency domain unit groups; and sending, by the terminal, the reference signal on the one or more frequency domain units to the base station based on the order indicated in the first parameter and the correspondence between the time unit and the frequency domain unit in the second parameter, wherein sending the reference signal on the one or more frequency domain units comprises simultaneously sending the reference signal on at least two of the frequency domain unit groups.

2. The method according to claim 1, wherein the reference signal sending configuration information comprises an indication of a time-frequency resource that is used to transmit the reference signal.

3. The method according to claim 1, wherein an order in which the terminal sends the reference signal on the one or more frequency domain units is preset.

4. The method according to claim 1, wherein the reference signal sending configuration information comprises at least one of the following information: a reference signal transmission period in a frequency domain unit, a reference signal bandwidth in the frequency domain unit, a maximum reference signal bandwidth in the frequency domain unit, a start subcarrier position in which the reference signal is sent in the frequency domain unit, or a correspondence between a time domain resource and a frequency domain position of the reference signal in the frequency domain unit.

5. The method according to claim 1, wherein the reference signal sending configuration information comprises a reference period indication parameter of the reference signal, and
wherein the terminal determines a reference signal transmission period in a frequency domain unit based on a quantity of frequency domain units supported by the terminal, a bandwidth of the frequency domain unit or a bandwidth that is used to transmit the reference signal in the frequency domain unit, and a frequency hopping bandwidth of each hop.

6. The method according to claim 1, wherein the reference signal sending configuration information comprises a reference bandwidth indication of the reference signal, and
wherein the terminal obtains a reference signal bandwidth in a frequency domain unit based on the reference bandwidth indication of the reference signal, a subcarrier spacing of the frequency domain unit, and reference signal frequency domain density in the frequency domain unit.

7. The method according to claim 1, wherein the reference signal sending configuration information comprises a reference start subcarrier indication of the reference signal, and wherein the reference start subcarrier indication of the reference signal is used to indicate a start subcarrier for sending the reference signal.

8. The method according to claim 1, wherein identifiers of start subcarriers of the reference signal in the one or more frequency domain units are the same.

9. The method according to claim 1, wherein the reference signal sending configuration information comprises an indication of a reference correspondence between a time domain resource and a frequency domain position of the reference signal; and
wherein the terminal determines the correspondence between the time domain resource and the frequency domain position of the reference signal in a frequency domain unit based on the reference correspondence between the time domain resource and the frequency domain position of the reference signal, or
wherein the terminal determines the correspondence between the time domain resource and the frequency domain position of the reference signal in the frequency domain unit based on a reference signal bandwidth in the frequency domain unit and the reference correspondence between the time domain resource and the frequency domain position of the reference signal.

10. The method according to claim 9, wherein the frequency domain position of the reference signal in the frequency domain unit is determined based on a time of sending the reference signal on the one or more frequency domain units supported by the terminal.

11. A reference signal sending apparatus, the apparatus comprising a processing unit and a transceiver unit, wherein:
the transceiver unit receives reference signal sending configuration information from a base station, wherein the reference signal sending configuration information instructs a terminal to transmit a reference signal on one or more frequency domain units, and wherein the one or more frequency domain units and another frequency domain unit form a part of a transmission bandwidth supported by the base station, wherein the reference signal sending configuration information comprises a first parameter and a second parameter, wherein the first parameter indicates an order in which the terminal transmits the reference signal on the one or more frequency domain units, and wherein the second parameter indicates a correspondence between a time unit at which the terminal sends the reference signal and a frequency domain unit on which the terminal sends the reference signal, wherein the reference signal sending configuration information comprises a grouping parameter that is used to instruct the terminal to group the one or more frequency domain units, and wherein the grouping parameter comprises a quantity of frequency domain unit groups;
the processing unit instructs the transceiver unit to:
determine, based on the one or more frequency domain units and the quantity of frequency domain unit groups indicated in the grouping parameter, frequency domain units included in each of the frequency domain unit groups; and
send, based on the order indicated in the first parameter and the correspondence between the time unit and the frequency domain unit in the second parameter, the reference signal on the one or more frequency domain units to the base station, wherein sending the reference signal on the one or more frequency domain units comprises simultaneously sending the reference signal on at least two of the frequency domain unit groups.

12. The apparatus according to claim 11, wherein an order in which the processing unit instructs the transceiver unit to send the reference signal on the one or more frequency domain units is preset.

13. A reference signal sending method, the method comprising:

receiving, by a terminal, reference signal sending configuration information from a base station, wherein the reference signal sending configuration information instructs the terminal to transmit a reference signal on at least one frequency domain unit, wherein the at least one frequency domain unit is a part of a transmission bandwidth supported by the base station, wherein the reference signal sending configuration information comprises: a first bandwidth that is used to indicate a bandwidth used to transmit the reference signal in the frequency domain unit, and a second bandwidth that is used to indicate a bandwidth for sending the reference signal on a symbol, and wherein the first bandwidth consists of a plurality of second bandwidths, wherein the first bandwidth is different from a total bandwidth of an actually sent reference signal, wherein the first bandwidth comprises a segment of consecutive bandwidths that include the total bandwidth of the actually sent reference signal, wherein the reference signal sending configuration information comprises a grouping parameter that is used to instruct the terminal to group the at least one frequency domain unit, and wherein the grouping parameter comprises a quantity of frequency domain unit groups;

determining, by the terminal based on a preset rule or indication information from the base station, to select some second bandwidths in a reference signal period to send the reference signal;

determining, by the terminal and based on the one or more frequency domain units and the quantity of frequency domain unit groups indicated in the grouping parameter, frequency domain units included in each of the frequency domain unit groups; and simultaneously sending, by the terminal, the reference signal on at least two of the frequency domain unit groups using the selected second bandwidths.

14. The method according to claim 13, wherein the plurality of second bandwidths used to send the reference signal are located on different symbols.

15. The method according to claim 13, wherein the preset rule is that, when the reference signal is used for beam sweeping, or a subcarrier spacing of the reference signal is greater than a reference subcarrier spacing or a subcarrier spacing that is of PUSCH transmission performed by the terminal on the frequency domain unit and that is configured by the base station, the terminal determines sending the reference signal in a reference signal period on some of the plurality of second bandwidths forming the first bandwidth.

16. The method according to claim 13, wherein the indication information comprises at least one of the following types of information: (1) indication information comprising identifiers of some second bandwidths, used to instruct the terminal to send the reference signal on the second bandwidths; (2) indication information comprising index information for obtaining identifiers of some second bandwidths, used to instruct the terminal to send the reference signal on the second bandwidths; (3) indication information comprising a frequency domain spacing, used to instruct the terminal to transmit the reference signal on the plurality of second bandwidths whose spacing is the frequency domain spacing, wherein the second bandwidths meeting the frequency domain spacing comprises a preset start frequency domain position or a start frequency domain position indicated by the base station; or (4) indication information comprising a sequence spacing of the second bandwidths, used to instruct the terminal to determine, based on the sequence spacing, some second bandwidths for sending the reference signal.

* * * * *